(12) United States Patent
White, Jr.

(10) Patent No.: US 7,454,378 B1
(45) Date of Patent: Nov. 18, 2008

(54) EXCHANGE METHOD AND APPARATUS

(75) Inventor: Newton B. White, Jr., Morristown, NJ (US)

(73) Assignee: Grenex Corp., Morristown, NJ (US)

( * ) Notice: Subject to any disclaimer, the term of this patent is extended or adjusted under 35 U.S.C. 154(b) by 1525 days.

(21) Appl. No.: 09/381,742

(22) PCT Filed: Aug. 21, 1998

(86) PCT No.: PCT/US98/17472

§ 371 (c)(1),
(2), (4) Date: Oct. 13, 1999

(87) PCT Pub. No.: WO99/10815

PCT Pub. Date: Mar. 4, 1999

Related U.S. Application Data

(60) Provisional application No. 60/066,526, filed on Nov. 25, 1997, provisional application No. 60/061,433, filed on Oct. 8, 1997, provisional application No. 60/056,815, filed on Aug. 22, 1997.

(51) Int. Cl.
*G06Q 30/00* (2006.01)
(52) U.S. Cl. .............................. 705/37; 705/36; 705/50; 705/75
(58) Field of Classification Search .................. 705/35, 705/37, 36, 50, 75
See application file for complete search history.

(56) References Cited

U.S. PATENT DOCUMENTS 3,573,747 A * 4/1971 Adams et al. ................. 705/37

4,677,552 A * 6/1987 Sibbley, Jr. ................... 705/37

(Continued)

FOREIGN PATENT DOCUMENTS

WO    WO 97/25801    * 7/1997

(Continued)

OTHER PUBLICATIONS

Dialog file# 148 1017033 by Kharouf et al. A trading room with a view, Nov. 1998.*

(Continued)

*Primary Examiner*—Raquel Alvarez
(74) *Attorney, Agent, or Firm*—Oppedahl Patent Law Firm LLC

(57) ABSTRACT

In one embodiment of the invention, a method for interacting with an offer matching system comprises a number of operations. For example, a first participant may communicate to the offer matching system a first description of a first offer. A first identifier is associated with the first offer and is not associated with any offer other than the first offer. (The first identifier may have been provided by the first participant or may have been created by the offer matching system, for example). If the first participant did not already know of the first identifier, then the offer matching system communicates it to the first participant. A second participant communicates to the offer matching system a description of a second offer that is capable of being executed at least in part against the first offer in accordance with a set of rules that govern the operation of the offer matching system. The first participant then discloses the first identifier to a first disclosee. The first discloses may then present a query to the order matching system, containing among other things information indicative of the first identifier.

106 Claims, 10 Drawing Sheets

U.S. PATENT DOCUMENTS 5,794,207 A     8/1998     Walker et al.

FOREIGN PATENT DOCUMENTS

WO     WO 98/10361     3/1998

OTHER PUBLICATIONS

Document entitiled, "Dec. 17, 1996 prior art search part 1.doc", This is a thirty page printout of a log file that was collected during an interaction with the Dialog search system on Dec. 17, 1996. It shows both the commands that were entered into the Dialog system and the output that was received.

May 25, 1971: U.S. Patent 3,581,072 titled "Auction Market Computation System".

1985: Excerpts from "Market Making and the Changing Structure of the Securities Industry".

Jan. 19, 1990: SEC Release No. 34-27611 re Delta Government Options Corp.

Oct. 3, 1990: Form 1 filed by Wunsch Auction Systems, Inc.

Feb. 20, 1991: SEC Release No. 34-28899 re Wunsch Auction Systems, Inc.

Dec. 31, 1991: U.S. Patent 5,077,665 titled "Distributed Matching System".

Aug. 4, 1992: U.S. Patent 5,136,501 titled "Anonymous Matching System".

Oct. 1994: NYSE Working Paper 94-02 titled "In Search of Liquidity: Block Trades in the Upstairs and Downstairs Markets".

Nov. 21, 1994: Document titled "arizona stock exchange user's guide Version 2.1".

Dec. 17, 1996: Document titled "Dec. 17, 1996 prior art search part 0.doc". This is a 217 page print out of a log file that was collected during an interaction with the Dialog search system on Dec. 17, 1996. It shows both the commands that were entered into the Dialog system and the output that was received. I have not reviewed that log file in detail. I have not obtained copies of the patents identified in that log file.

* cited by examiner

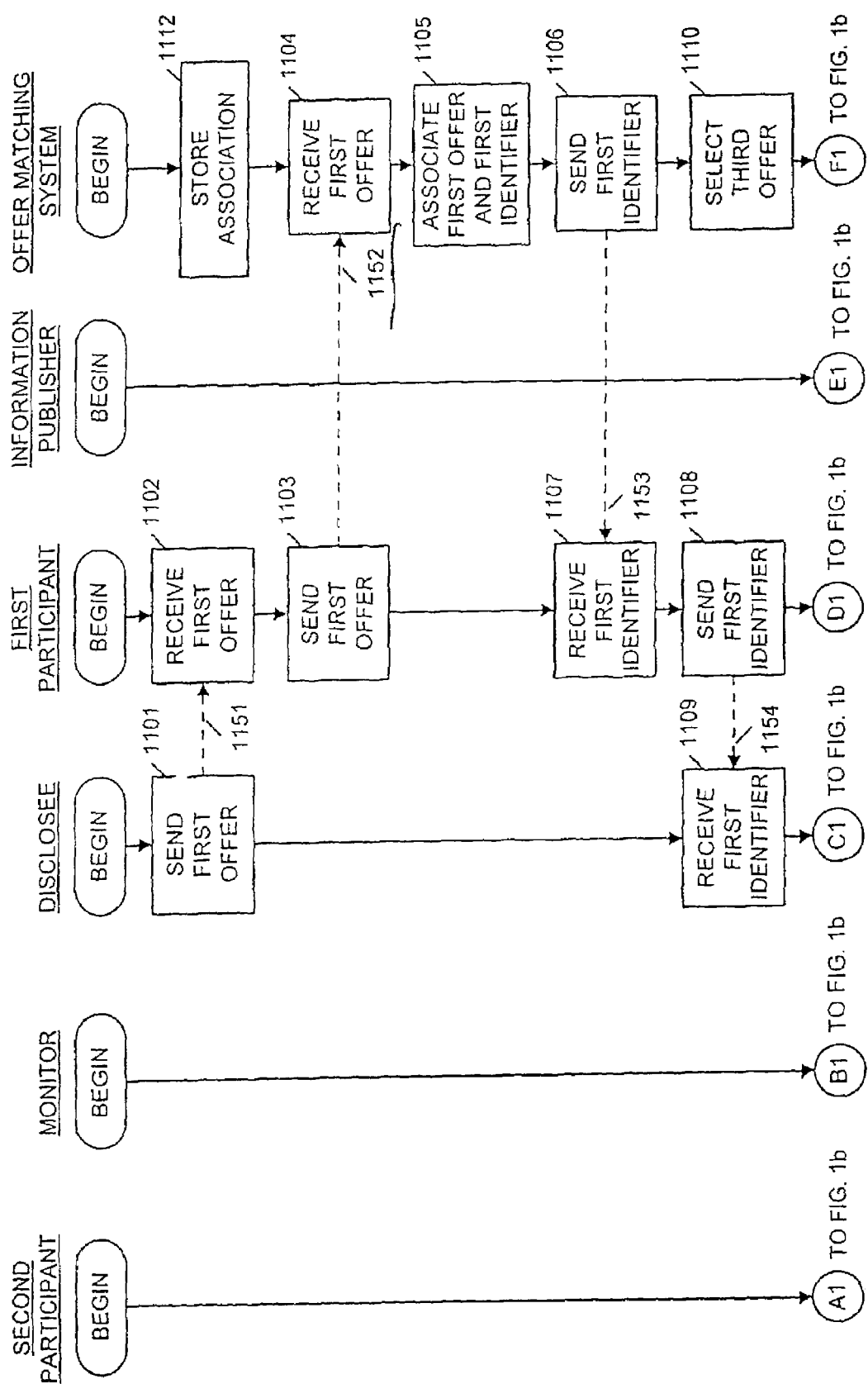

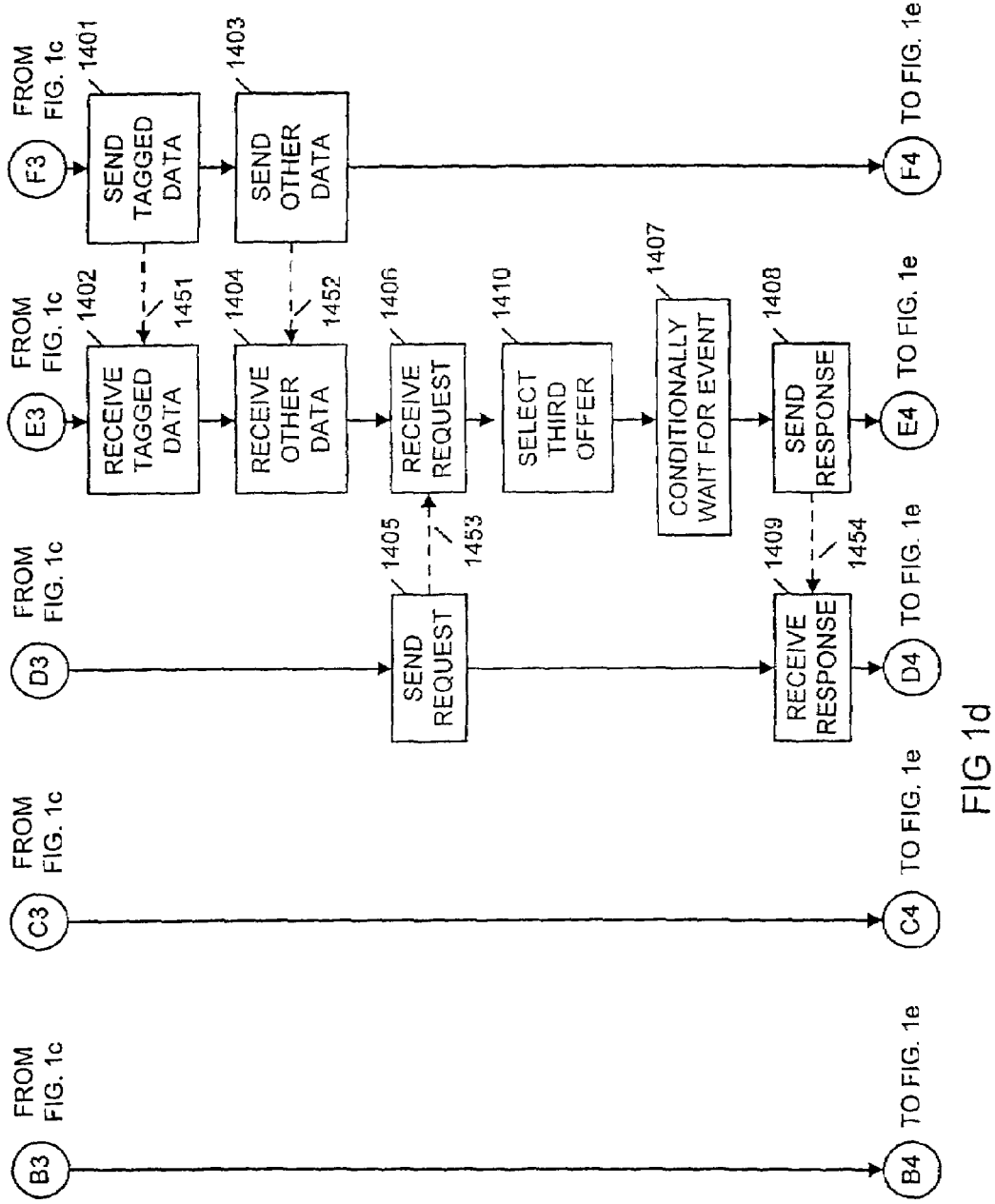

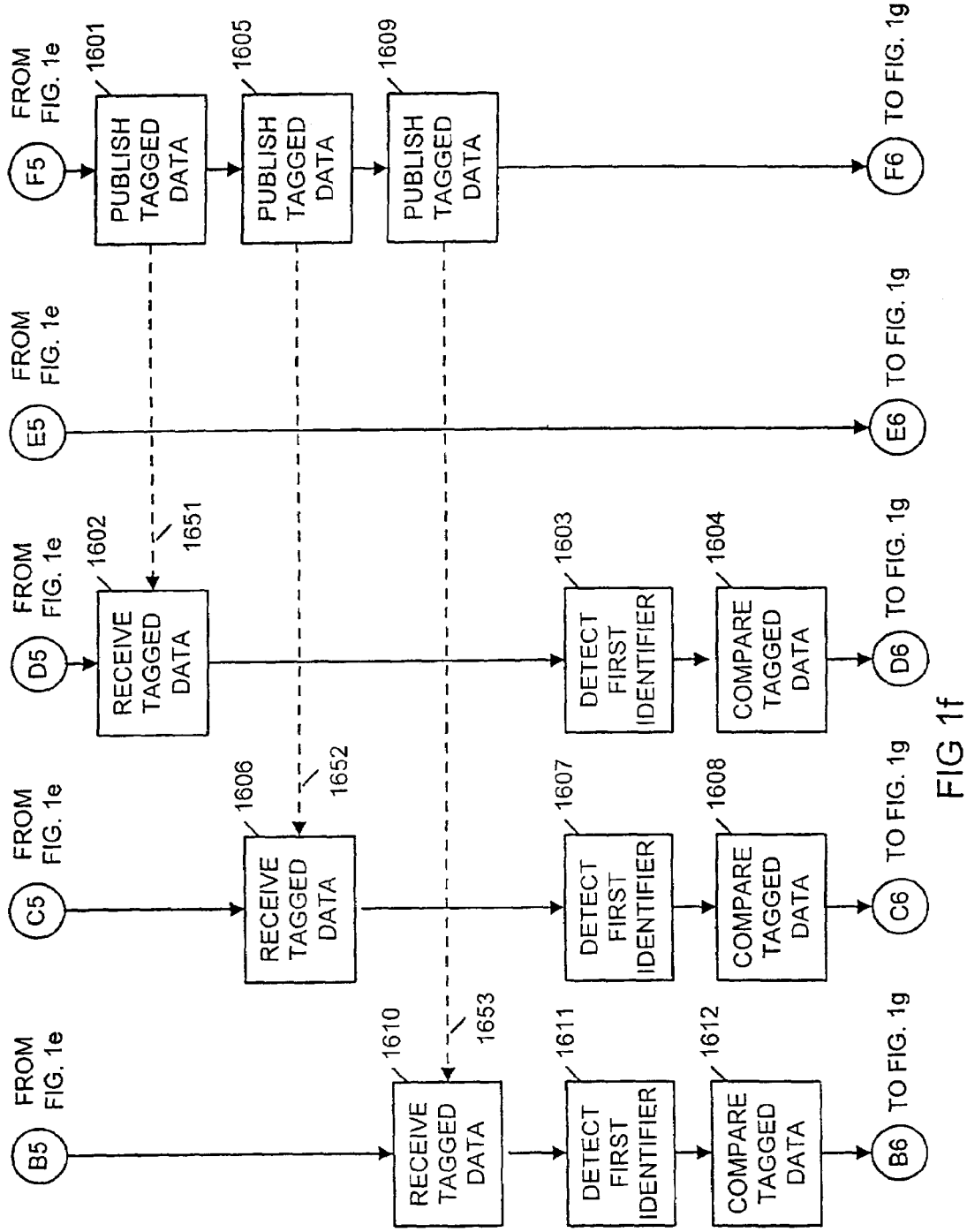

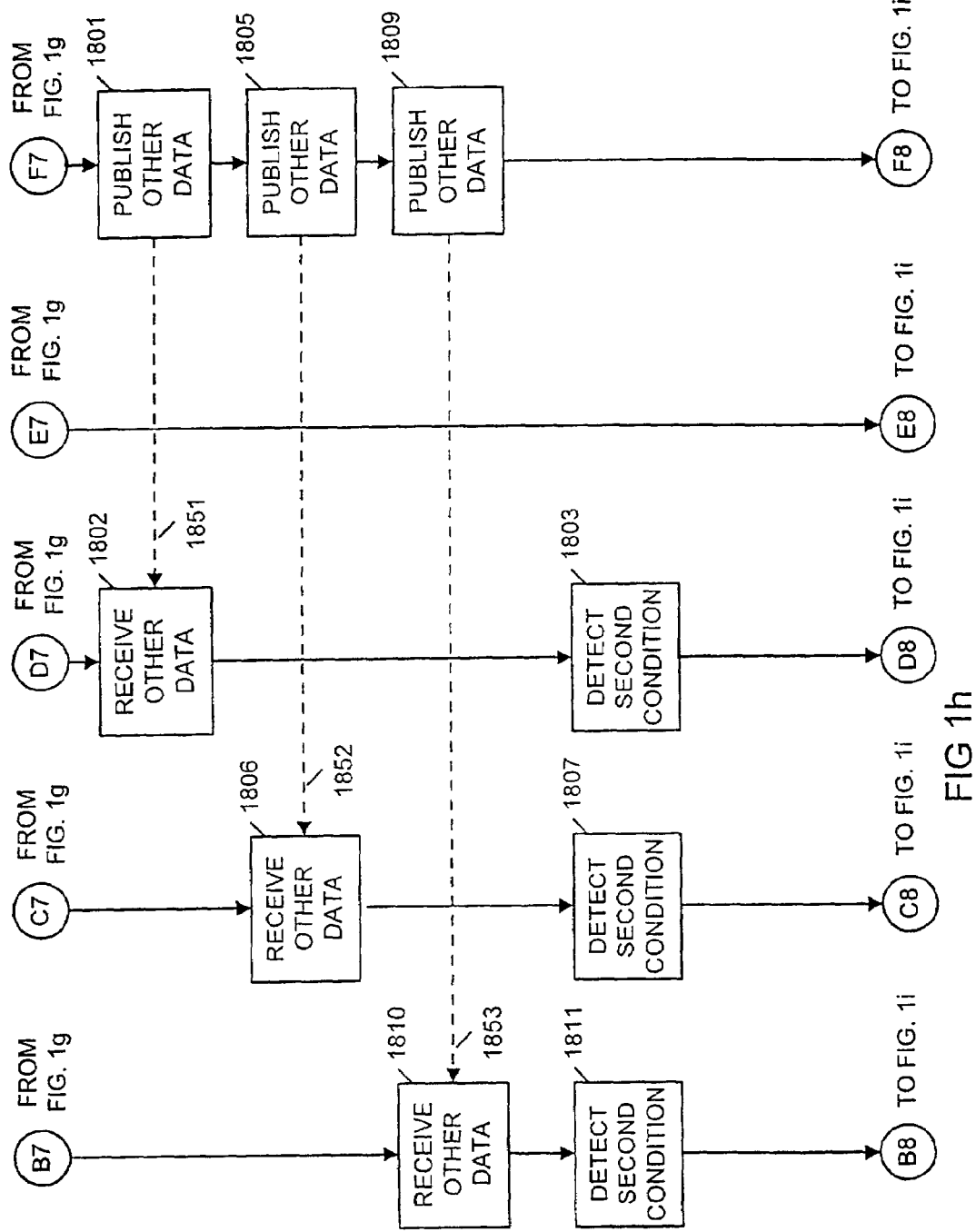

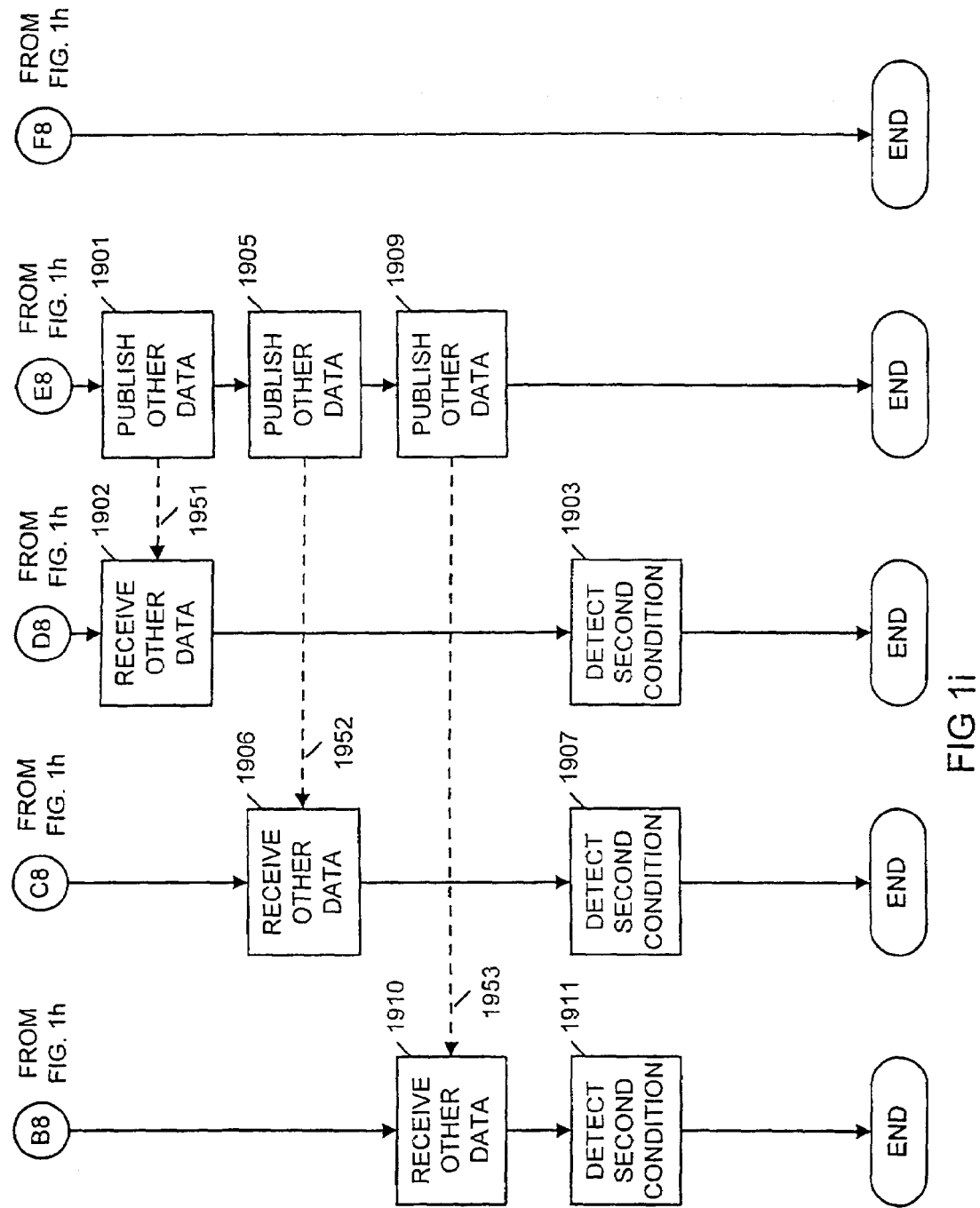

EXCHANGE METHOD AND APPARATUS

This application claims priority from pending U.S. Provisional Applications described as follows:

Appl. Ser. No. 60/056,815 filed on Aug. 22, 1997
Appl. Ser. No. 60/061,433 filed on Oct. 8, 1997
Appl. Ser. No. 60/066,526 filed on Nov. 25, 1997, all of which are hereby incorporated by reference.

BACKGROUND OF THE INVENTION

The invention relates generally to using an offer matching system to collect and to execute binding offers to buy and to sell a traded item. Existing offer matching systems typically operate in a manner that allows a participant to receive fairly complete information about offers submitted by such participant and the status of such offers. Existing participant systems typically operate in a manner that allows a customer who submits an order to a participant system to receive fairly complete information about offers submitted by such customer. However, existing offer matching systems do not typically permit unknown persons to receive detailed information about an offer.

Existing offer matching facilities typically include a central computer (referred to herein as an offer matching system) that is programmed to accept offers from multiple remotely located participant systems and to execute compatible buy and sell offers in accordance with a predetermined set of rules. (By "execute" we mean give rise to a binding obligation to clear and settle a trade.)

For example, an offer matching system for securities operated by a stock exchange that is organized as a not-for-profit member organization might include a central computer facility operated by the stock exchange organization (referred to herein as the offer matching system) that communicates with multiple computer systems operated by its members (referred to herein in as participant systems). As another example, an alternative trading facility for securities operated by a broker-dealer might include a central computer system operated by the broker-dealer (referred to herein as an offer matching system) that communicates with multiple computer systems (referred to herein as participant systems) operated by clients of the broker dealer.

The term "offer matching system" is herein limited to systems where offers submitted by participants represent binding offers by participants to buy or to sell one or more traded items, subject to predetermined terms and conditions. Thus the present invention does not concern so called "bulletin board systems" where participants can post non-binding indications of interest in buying or selling one or more traded items.

Existing offer matching systems operated by stock exchanges often permit a few members, referred to as specialists, to submit quotations which are in effect offers to buy or to sell securities for the quoted prices. For purposes herein, such quotations from specialists are included within the term "offer". Other existing offer matching systems permit participating market makers to publish bid and ask quotations that the market makers are obligated to honor, subject to various limitations and exceptions. For purposes of this description, such quotations from market makers are included within the term offer. Existing offer matching systems often permit participants to submit offers to buy or to sell a specified quantity (or less) of a traded item at a specified price (or better). Such offers are also included within the term "offer" as used herein.

Typically, if an existing offer matching system determines that a particular offer is to be executed, then the participant that submitted such offer becomes legally bound to buy or to sell (as the case may be) a particular quantity of the relevant traded item for a particular price, subject to predetermined terms and conditions applicable to the operation of the offer matching system. For example, if a first participant (for example a market maker) submitted to an offer matching system a first offer to buy a large number of shares of Acme common stock for $1.00 per share or better and a second participant (for example, a broker forwarding an offer on behalf of a client) submitted to the offer matching system a second offer to sell 100 shares of Acme common stock for $1.00 per share or better, then the offer matching system might determine that the first offer can be executed against the second offer for 100 shares at a price of $1.00 per share. In such a case, the first participant would become obligated to buy 100 shares of Acme common for $1.00 per share and the second participant would become obligated to sell 100 shares of Acme common for $1.00 per share.

There are many different methods that might be used to consummate trades once an offer matching system determines that particular offers are to be executed. In the case of the above example of a trade of 100 shares of Acme common for $1.00 per share, the offer matching system could disclose to both the first participant and the second participant the identity of the other, in which case the first participant and the second participant could clear and settle the trade directly with one another. As an alternative, all trades might occur with a single designated intermediary (such as a specialist in the case of a stock exchange or a sponsoring broker dealer in the case of an alternative trading system). If a single designated intermediary were used, then the first participant would become obligated to buy 100 shares of Acme common from the designated intermediary, the designated intermediary would become obligated to sell 100 shares of Acme common to the first participant, the second participant would become obligated to sell 100 shares of Acme common to the designated intermediary and the designated intermediary would become obligated to buy 100 shares of Acme common from the second participant—and there would be no need to reveal to the first participant the identity of the second participant, or vice versa. As used herein, the expression "execute one offer against another offer" includes both the case where the submitting participants become obligated to trade directly with one another and the case where the submitting participants become obligated to trade with one or more intermediaries.

Existing offer matching systems typically include some facility for distributing information about outstanding offers and about trades arising out of the execution of offers. It is typical for such facilities to include:

Electronically publishing information about prices and/or quantities for offers currently active in the offer matching system. Such information might be limited to the current best priced buy and sell offers, or it might include information about several buy and sell offers. Often such information does not identify the persons responsible for a particular offer unless such persons are specialists or market makers.

Electronically publishing information about trades executed by the offer matching system. Well known examples of this include stock tickers which publish for each trade the affected security, the quantity traded and the price at which a trade occurred.

Permitting participant systems that have established a secure communications link to obtain detailed information about offers for which the relevant participant is responsible.

SUMMARY OF THE INVENTION

In one embodiment of the invention, a method for interacting with an offer matching system comprises a number of operations. For example, a first participant may communicate to the offer matching system a first description of a first offer. A first identifier is associated with the first offer and is not associated with any offer other than the first offer. (The first identifier may have been provided by the first participant or may have been created by the offer matching system, for example.) If the first participant did not already know of the first identifier, then the offer matching system communicates it to the first participant. A second participant communicates to the offer matching system a description of a second offer that is capable of being executed at least in part against the first offer in accordance with a set of rules that govern the operation of the offer matching system. The first participant then discloses the first identifier to a first disclosee. The first disclosee may then present a query to the order matching system, containing among other things information indicative of the first identifier. In response to the first request, and without the offer matching system's determining that the first request was made by a person entitled to receive confidential information concerning the first offer, the offer matching system communicates to the first disclosee a first data item concerning the first offer.

Another embodiment of the invention directs itself to the problem that some firewall systems make it difficult or impossible for a server and client to communicate in a secure way if default parameters are employed. In a TCP/IP system, there are well-established port numbers. As a default, TCP port 80 is used for hypertext transfer protocol (http) communications. But in the Internet, one of the design assumptions is that the communications links are insecure. This has prompted development of a secure http protocol (https) in which the client and server establish "secure sockets" according to which they can communicate in relative security. As a default, TCP port 443 is used for this purpose.

Designers of firewalls, however, often choose to block most TCP port numbers, permitting only a small handful of port numbers to be open. Given the near-ubiquity of the Web's http servers, a firewall designer will almost always find a way to permit port 80 to be open. But in many firewalled systems it turns out that the firewall designer has not permitted port 443 to be open. The result in practical terms is that a web user is unable to reach secure sites that use the https protocol.

In accordance with the invention, a method is provided for securely communicating with a server program using a secure hypertext transfer protocol, the method comprising:

(a) configuring the https server program so that it listens for requests for secure hypertext transfer protocol sessions on port 80 rather than port 443;

(b) receiving at the server program on port 80 a first data packet in a manner that is consistent with the secure hypertext transfer protocol, except that the request is received on port 80 rather than port 443;

(c) outputting from the server program a response to the first data packet in a manner that is consistent with the secure hypertext transfer protocol, except that the request was received on port 80 rather than port 443.

In this way an entire https session can take place, mediated by port 80, and thus is permitted to be established and carried out even if the user (client) is located on a system having a firewall that blocks port 443.

DESCRIPTION OF THE DRAWING

The invention will be described with respect to a diagram, of which.

DETAILED DESCRIPTION

Figure 1B:
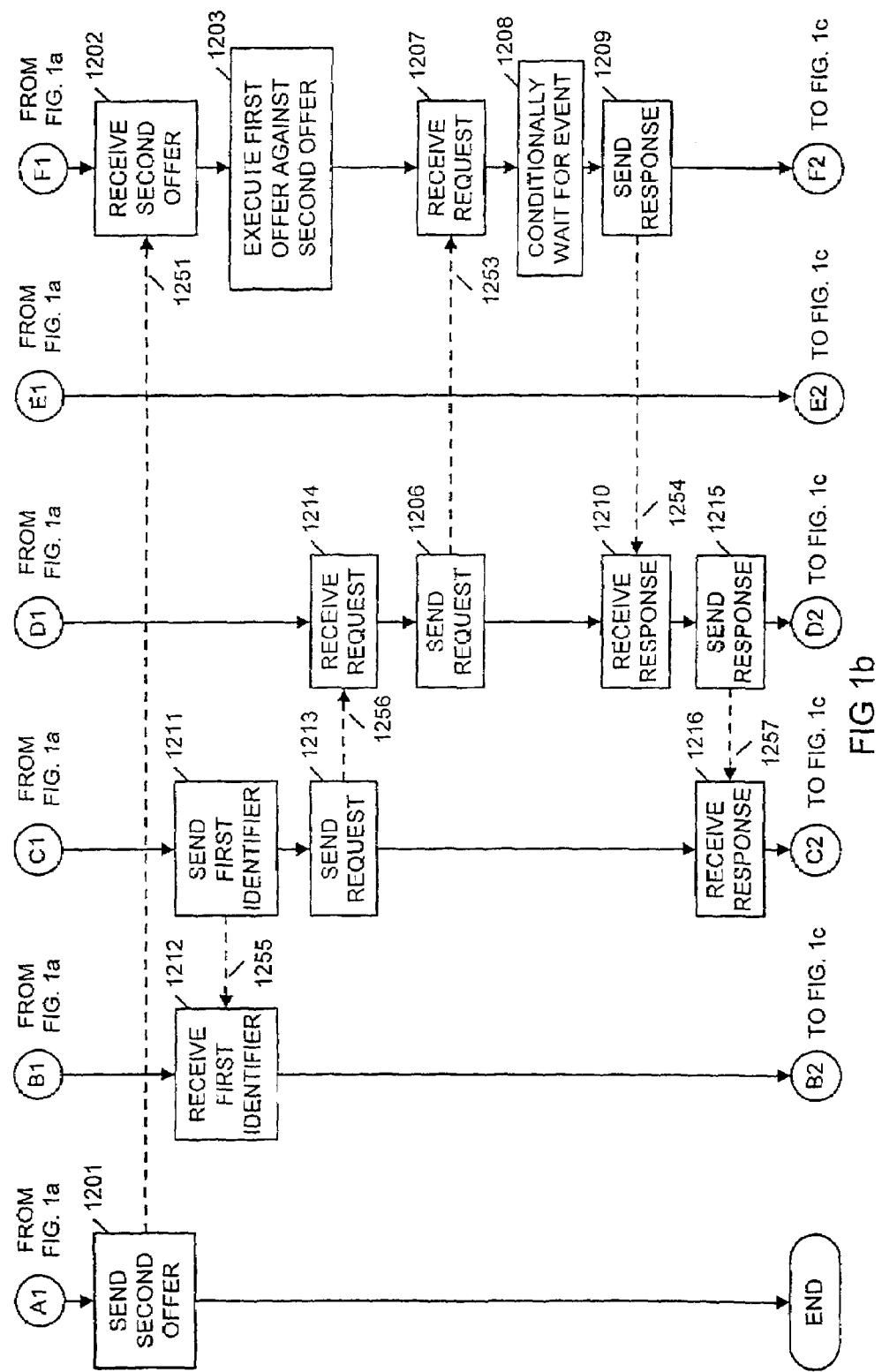
FIG. 1, parts a-i, shows parallel flowcharts that illustrate the top level communications protocol used to implement the invention.
Figure 1C:
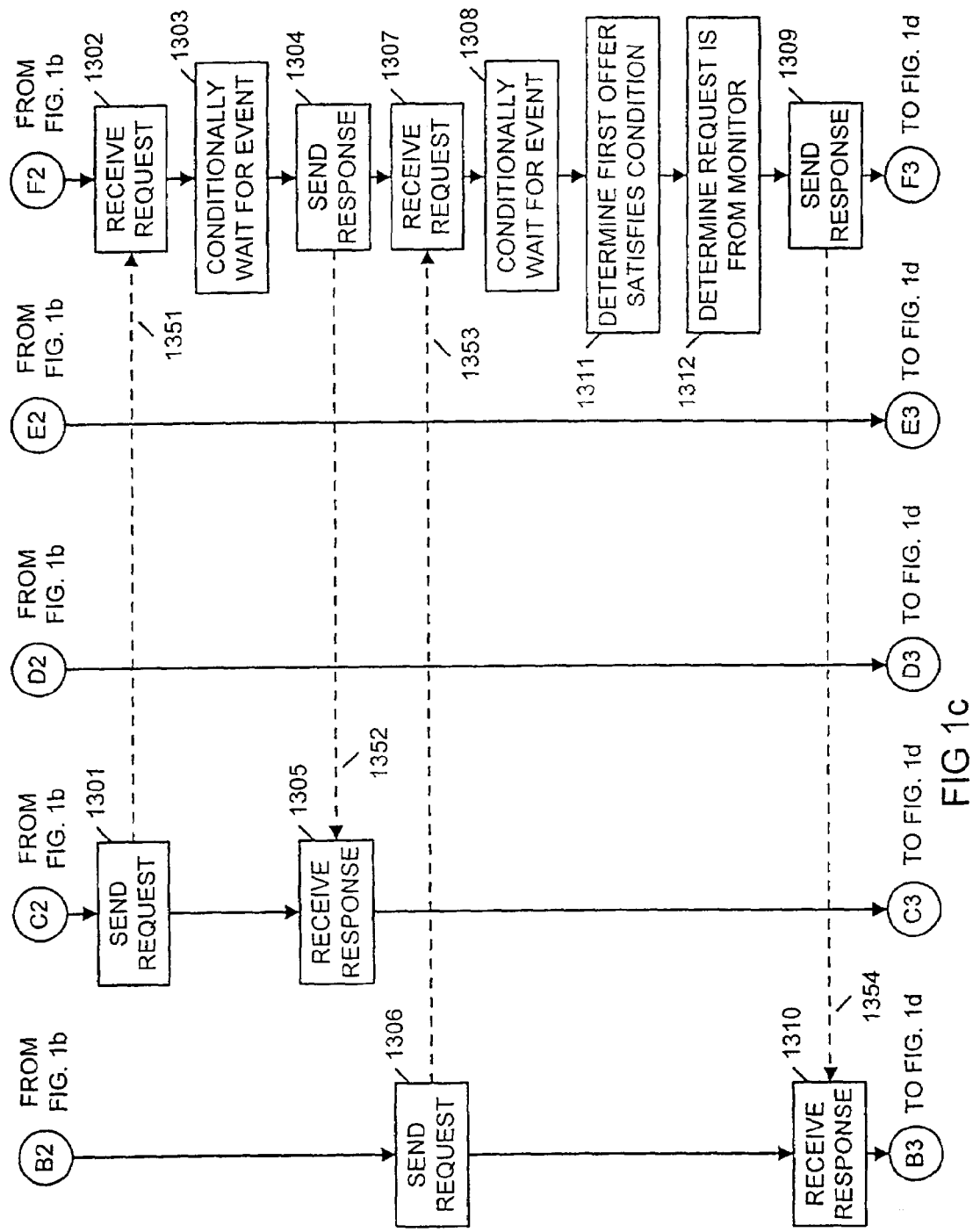
Figure 1E:
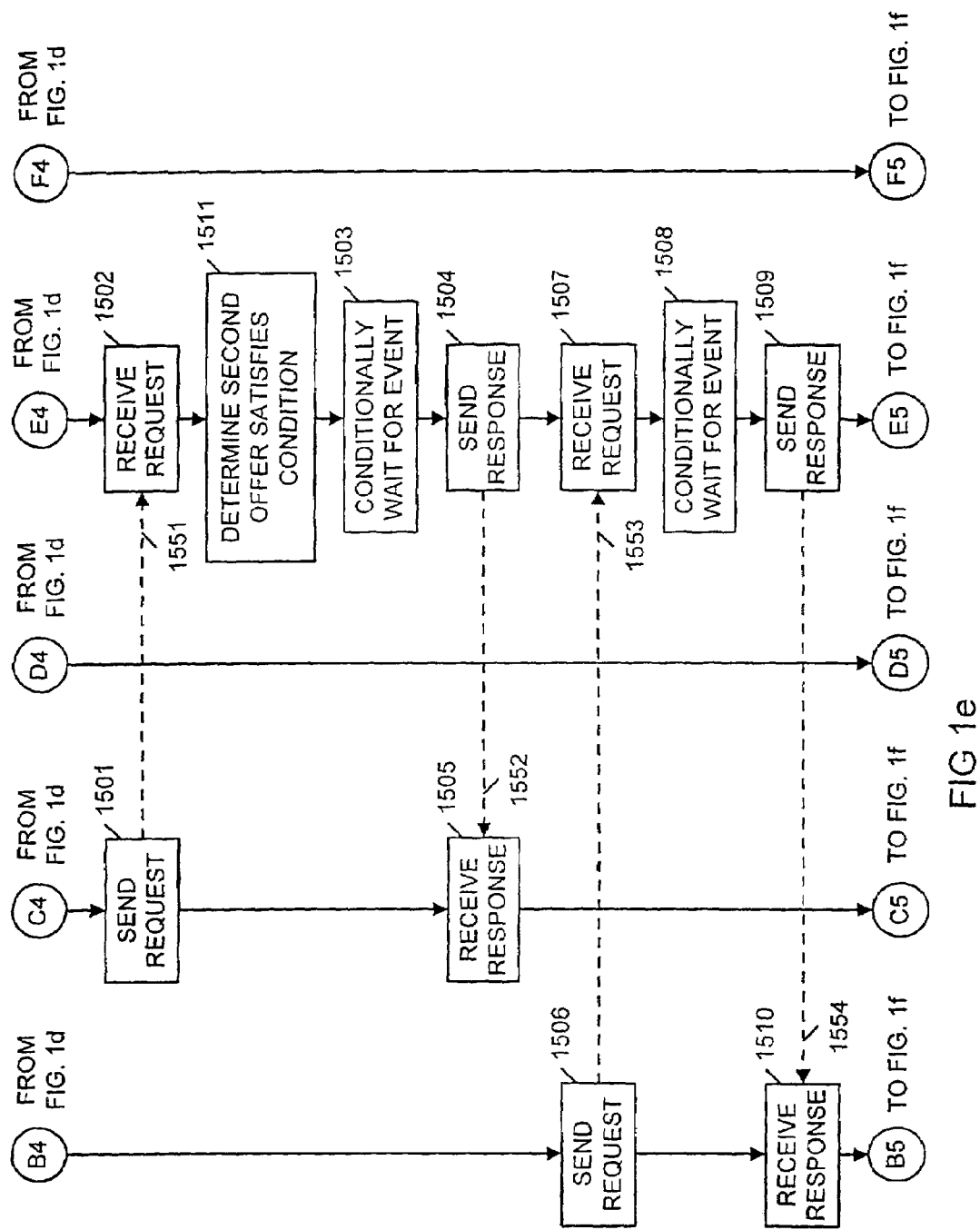
Figure 1G:
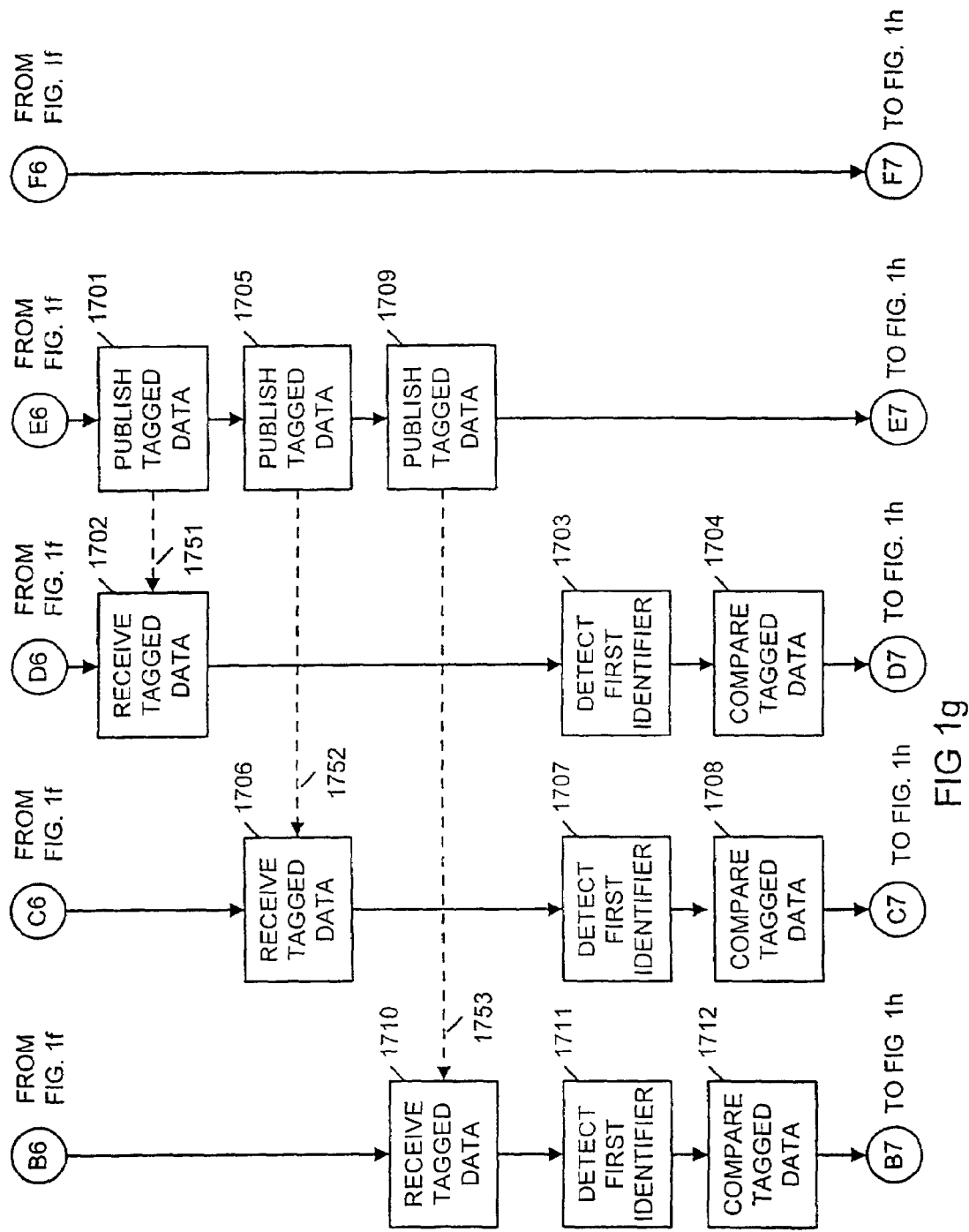
Figure 2:
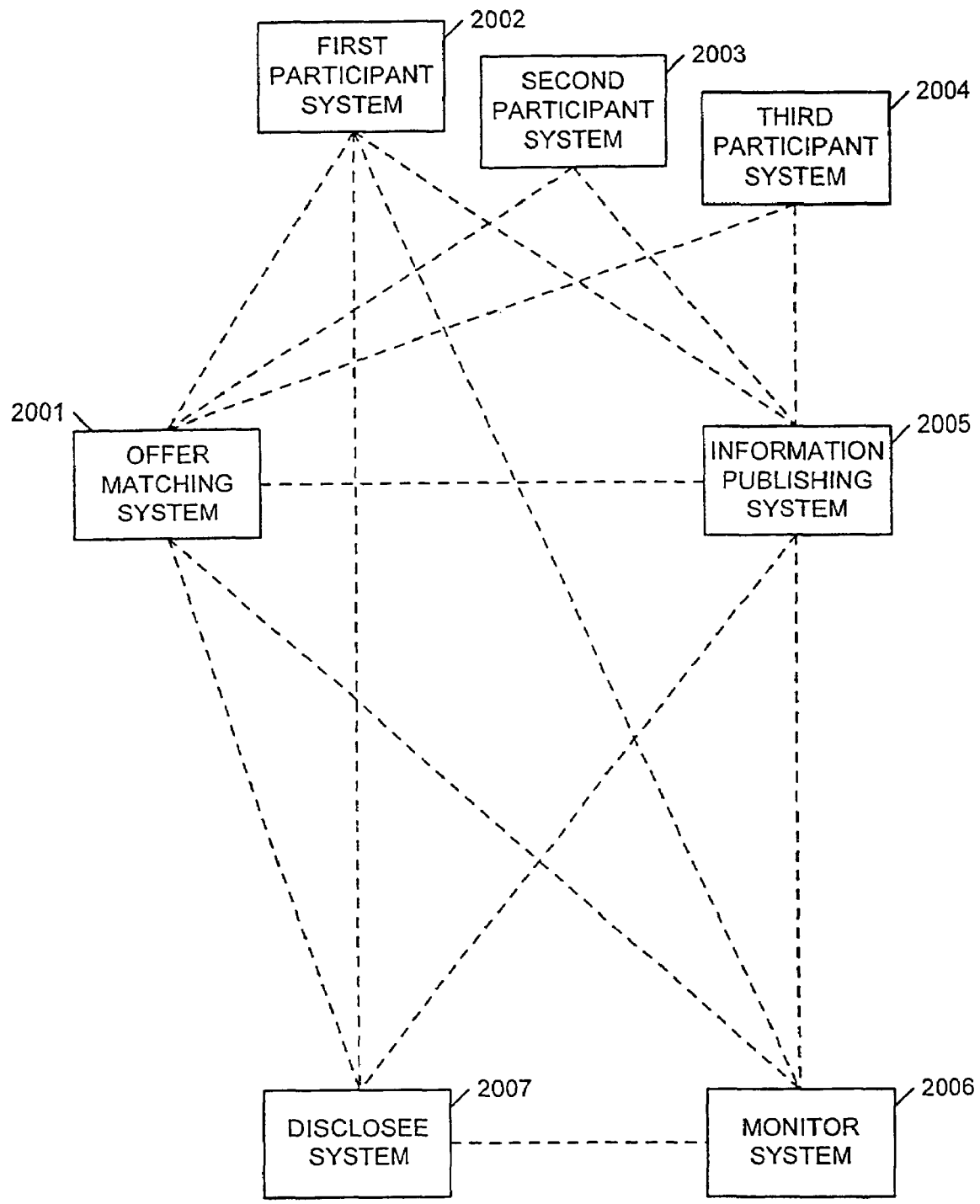
FIG. 2 shows in schematic form several communication links among an offer matching system, a plurality of participant systems, an information publishing system, a disclosee system and a monitor system.

FIG. 2 shows in schematic form an offer matching system 2001 communicatively coupled to a plurality of participant systems 2002, 2003 and 2004, an information publishing system 2005, a disclosee system 2007 and a monitor system 2006. FIG. 2 also shows communication links among several of the other systems. In one embodiment of the invention, each system is geographically remote from the other systems. It will be appreciated that in this context "publish" may mean "broadcast".

Those skilled in the art will appreciate that:

although FIG. 2 depicts an example embodiment with a single offer matching system, the invention contemplates that multiple offer matching systems can be used (for example, different traded items could be allocated to different offer matching systems to improve performance), although FIG. 2 depicts an example embodiment with only three participant systems, the invention contemplates that the offer matching system can be communicatively coupled with many participant systems (for example, several broker dealer firms might each have a participant system or several traders at a single broker dealer firm might each have a participant system), although FIG. 2 depicts an example embodiment with a single information publishing system, the invention contemplates that the offer matching system can be communicatively coupled with many information publishing systems at the same time (for example, an information publishing system that publishes information using a proprietary network, an information publishing system that publishes information using the Internet or an information publishing system that publishes information using radio frequency transmissions), although FIG. 2 depicts an example embodiment with a single disclosee system, the invention contemplates that the offer matching system can be communicatively coupled with many disclosee systems at the same time (for example each of several individual investors could operate a disclosee system connected to the Internet to obtain information about the status of orders submitted to the offer matching system), and although FIG. 2 depicts an example embodiment with a single monitor system, the invention contemplates that the offer matching system can be communicatively coupled with many monitor systems at the same time (for example, monitor systems can be operated by clearing brokers who clear and settle trades for various broker dealer participants, banks that lend money to broker dealer participants, and compliance and risk management personnel who work for broker dealer participants).

In an exemplary embodiment of the invention, each of the offer matching system 2001 and the information publishing system is an International Business Machines Personal Computer compatible computer system that utilizes the Microsoft Windows NT Server Version 4.0 operating system, Microsoft SQL Server Version 6.5 and the following items from the Microsoft Windows NT 4.0 Option Pack: Certificate Server, FrontPage 98 Server Extensions, Internet Information Server Version 4.0, Microsoft Data Access Components 1.5, Microsoft Index server, Microsoft Management Console, NT Option Pack Common Files, Microsoft Transaction Server Version 2.0, and Windows Scripting Host.

In an exemplary embodiment of the invention, each of the first participant system 2002, second participant system 2003, third participant system 2004, disclosee system 2006 and monitor system 2007 is an International Business Machines Personal Computer compatible computer system that utilizes the Microsoft Windows NT Workstation Version 4.0 operating system and Microsoft Internet Explorer version 4.0.

Those skilled in the art will appreciate that two or more of the systems depicted in FIG. 2 could be run on the same computer. In fact, for software development purposes, all of the systems depicted in FIG. 2 can be run on a single general purpose stored program computer which has been programmed appropriately.

In one embodiment of the invention, each of the systems depicted in FIG. 2 is connected to a single network (such as a local area network or the Internet) that permits each of such systems to communicate with the others. In an exemplary embodiment of the invention:

each of the participant systems and the information publishing system is communicatively coupled to the offer matching system using a network that is independent of the Internet, such as, but not limited to, a network of leased lines, a private frame relay network, a controlled access network that utilizes the Financial Information Exchange protocol, or using modems over the switched telephone network, and each of the disclosee system and the monitor system is communicatively coupled to the other systems via the Internet using the secure sockets layer protocol and a secure hypertext transfer protocol.

Those skilled in the art will appreciate that the communication links among the systems depicted in FIG. 2 may be implemented using any communication technology that is used to communicate between computer systems, including, but not limited to: local area networks (including, but not limited to, local area networks implemented using ethernet, 10BaseT, 100BaseTX, fiber optics, wireless radio frequency links, wireless infrared links, etc.) and wide area networks (including, but not limited to, the switched telephone network, leased telephone lines, electronic mail, microwave links, frame relay networks, satellite data links, X.25 networks, fiber optic networks, etc.).

FIG. 1, parts a-i, are parallel flowcharts that illustrate an exemplary communications protocol that can be used to implement the invention.

Those skilled in the art will appreciate that an offer matching system normally will be configured by system operators and/or participants before it is used to match offers. The invention contemplates that configuration of the offer matching system will include configuration by operators of the system and by participants. In particular, the invention contemplates that: (a) employees of the firm that operates the offer matching system will typically enter information concerning (i) traded items for which the offer matching system will accept and match offers and (ii) participants who are permitted to submit binding offers to the offer matching system and (b) employees of participants will typically enter information to configure processing options offered by the trading system. In an exemplary embodiment, a first participant can communicate to the offer matching system a request to store various associations, which the offer matching system will store 1112 in a memory facility of the offer matching system.

In one embodiment of the invention, a participant or an operator of the offer matching system can configure the offer matching system to disclose otherwise confidential information about an offer to a monitor in certain conditions by directing the offer matching system to store 1112 an association among a first target (e.g., the individual or entity to be monitored), a first monitor (e.g., the individual or entity to which extra information will be disclosed) and a first condition (e.g., the condition that must be satisfied by an offer before extra information about it can be disclosed to the first monitor). The first condition can include, without limitation, requirements such as the following:

an offer is for the benefit of the first target (for example, and not by way of limitation, (i) if the target were an investor and the monitor were that investor, then that investor could receive confidential information about offers submitted by participants acting as such investor's broker, (ii) if the target were a participant and the monitor were a clearing broker who clears and settles trades for such participant, then such clearing broker could receive confidential information about offers where such participant is acting as a principal), an offer is for the account of the first target, the first target made an investment decision to make an offer (e.g., but not by way of limitation, compliance or risk management personnel of a participant could be permitted to receive confidential information about offers that arise out of an investment decision by a particular individual), the first target has a financial interest in an offer, the first target is financially responsible (as principal, guarantor or otherwise) for an offer (for example, and not by way of limitation, if the first target were a participant and the first monitor were a bank that loans money to such participant, then such bank could receive confidential information about offers for which such participant is financially responsible), the first target is financially responsible (as principal, guarantor or otherwise) for a trade arising out of an offer, the first target is acting as an agent with respect to an offer, and the first target is acting as a principal with respect to an offer.

In one embodiment of the invention, a participant or an operator of the offer matching system can configure the offer matching system to direct that an offer submitted by a first participant will not be executed unless and until a second person approves such offer. In an exemplary embodiment, the offer matching system can be configured by directing the offer matching system to store 1112 an association among a first participant (e.g., the participant whose offers must be approved) and a first monitor (e.g., the individual or entity that must approve offers received from the first participant).

Those skilled in the art will appreciate that the invention contemplates that the offer matching system will be configured in several other ways that are typical of offer matching systems.

An investor who wishes to utilize the offer matching system of the invention can send 1101 a description 1151 of a first offer from a disclosee system 2006 operated by the investor to a first participant system operated by a participant. In an exemplary embodiment, the investor uses a web browser (such as Microsoft Internet Explorer) and secure sockets layer running on the discloses system to communicate via the Internet with a site on the world wide web that is operated by a registered securities broker that accepts from the investor a binding offer (often referred to as a limit order) to buy or to sell a specified quantity of a specified security for a specified price or better. Those skilled in the art will appreciate that the communication of a description of the first offer from the investor and the broker can be accomplished in many other ways, including, but not limited, the FIX protocol, by fax, orally, etc. Those skilled in the art will appreciate that the format and contents of the first description 1151 of the first offer can vary greatly while still accomplishing the basic task of communicating a description of the first offer. The invention permits investors to submit orders to brokers and dealers by whatever mechanisms they currently use to submit such orders, except that (i) in an exemplary embodiment, each offer submitted by an investor is a limit order and (ii) in an exemplary embodiment, the communication between the investor and the broker dealer is augmented so that an order identifier associated with the order can be communicated between the investor and the broker.

A first participant system 2002 operated by a participant can utilize the services of the offer matching system in two primary ways: acting as a broker (i.e., acting as an agent for a client) or acting as a dealer (i.e., acting as a principal). When the first participant acts as a broker, the first participant system can receive 1102 a first description 1151 of a first offer from a first disclosee system 2007 operated by an investor. When acting as a dealer (i.e., when acting for the first participant's own account), the first participant system can receive or generate a description of a desired offer by any means that the first participant might desire.

Once a description of a desired first offer is stored in the first participant system 2002 (regardless of whether the first participant is acting as a broker for an offer received from a client or is acting as a dealer for an offer for the first participant's own account), the first participant can send 1103 a description 1152 of the first offer to the offer matching system 2001. In an exemplary embodiment, the description of the first offer sent from the first participant to the offer matching system will contain the information about the first offer supplied by the disclosee and will also contain additional information supplied by the first participant. In an exemplary embodiment, the description received 1104 by the offer matching system 2001 can include, without limitation:

- a password and other information relevant to confirming who submitted the first offer and that the first offer has not been modified during transmission
- an identifier for the first offer,
- an identifier for an order replaced by the first offer,
- an indication of whether the participant claims to be acting as a principal (i.e., dealer) or as an agent (i.e., broker) with respect to the first offer,
- an indication of whether the first offer may be executed in part without being executed in full,
- a time by which the first offer must be approved to avoid automatic cancellation,
- an indication of whether the first offer is an offer to buy or an offer to sell,
- information that identifies one or more circumstances in which the offer matching system should automatically cancel the first offer,
- information about how any trades arising out of the first offer are to be cleared and settled,
- a time before which the offer ought not be executed,
- a time at which the first offer is scheduled to expire,
- an indication of how often the offer matching system may attempt to execute the first offer,
- information that identifies a circumstance in which the offer matching system may automatically adjust the quantity or price of the first offer,
- a time when the first offer was initiated,
- an indication of who initiated the first offer,
- an indication of whether the first offer was submitted by or on behalf of a participant or member in the offer matching system,
- an indication of whether any odd lot portion of the first offer may be executed in part without being executed in whole,
- an indication of whether any round lot portion of the first offer may be broken into odd lots,
- an indication of whether any odd lot portion of the first offer may be executed at a price that is not the same as a price at which a round lot has executed,
- an indication of whether the first offer was submitted by or on behalf of an issuer of the applicable traded item,
- an indication of whether the first offer is a stabilizing offer,
- a limit price for the first offer below or above which it can not be executed,
- an indication that the first offer may be executed at a market price,
- an indication that the first offer may be executed at a closing price,
- an initial quantity for the first offer,
- a time when the first offer was first received by the first participant,
- a time when a description of the first offer was first received by the offer matching system,
- an indication of who at the participant first received the first offer,
- an indication of how the first offer was generated,
- an indication of the traded item to which the first offer relates,
- if the offer is an offer to sell, an indication of whether the offer is long, short or short exempt, and
- an indication of whether the offer was solicited by the first participant.

Those skilled in the art will appreciate that there are many different ways to associate 1105 a first offer and a first identifier. For example, and not by way of limitation:

the discloses can generate a proposed identifier that is included in a first description 1151 communicated 1101, 1102 to a first participant, the first participant can include the proposed identifier (or a second proposed identifier derived therefrom) in the description 1152 communicated 1103, 1104 to the offer matching system, and the offer matching system can store in its memory an association between the first offer and the proposed identifier received from the first participant;

the disclosee can obtain from the offer matching system a unique identifier that is then communicated from the discloses to the first participant to the offer matching system; the first participant can generate a proposed identifier that the first participant then communicates 1103, 1104 to the offer matching system and communicates 1108, 1109 to the disclosee;

the first participant can obtain from the offer matching system an identifier that the first participant then communicates 1103, 1104 to the offer matching system and communicates 1108, 1109 to the disclosee; and in an exemplary embodiment, after receiving a description of the offer, the offer matching system can generate a first identifier, store an association between the first identifier and the first offer in the memory of the offer matching system, and communicate 1106, 1107 the first identifier 1153 to a first participant which then communicates 1108, 1109 the first identifier 1154 to a first disclosee.

If a system other than the offer matching system (e.g., a participant system, disclosee system or monitor system) proposes that a particular identifier be associated with the first offer, then the offer matching system must confirm that the proposed identifier is not already associated with another offer. If a proposed identifier is already associated with another offer, then the offer matching system could either reject the offer or accept the offer but associate a different identifier. In an exemplary embodiment, the offer matching system generates the first identifier and communicates 1106, 1107 the first identifier 1153 to the first participant. The present invention is not limited to any particular method for associating the first offer with a first identifier.

In an exemplary embodiment of the invention, once the offer matching system has received a first description of a first offer and associated a first identifier with the first offer, then the rules for the offer matching system, and the offer matching system, will permit information, including, but not limited to the following, to be publicly disclosed about the first offer:

- an indication of whether the first offer is an All Or None offer (i.e., an indication of whether the first offer must be executed in full or not at all),
- an indication of whether the offer is an offer to buy or an offer to sell,
- an indication of whether the offer should be automatically canceled in various circumstances,
- a time before which the first offer ought not be executed,
- if the first offer has become capable of execution, an effective time as of which the first offer first became capable of execution,
- an expiration time after which the first offer ought not be executed,
- if defined, a finish time as of which the first offer first became incapable of execution,
- if defined, a finish type that indicates why the first offer first became incapable of execution,
- an indication of whether the first offer is an Immediate Or Cancel offer, for which any unexecuted portion will be canceled immediately after the offer matching system first attempts to execute the first offer,
- information that identifies a circumstance in which the offer matching system may automatically adjust the quantity or price of the first offer,
- an indication of whether the first offer was submitted on behalf of a participant or member in the offer matching system,
- an indication of whether an odd lot portion of the first offer may be executed in part without being executed in whole,
- an indication of whether a round lot portion of the first offer may be broken into odd lots, an indication of whether an odd lot portion of the first offer may be executed at a price that is not the same as a price at which a round lot has executed (i.e., that odd lot portions may execute a prices that are different from the prices at which round lots are executed),
- a unique identifier associated with the first offer,
- an identifier for an order replaced by the first offer,
- a time by which the first offer must be approved to avoid automatic cancellation,
- a limit price for the first offer below or above which it can not be executed,
- an initial quantity for the first offer,
- a remaining quantity for the first offer,
- a time when a description of the first offer was first received by the offer matching system,
- an indication of how the first offer was generated (e.g., computer generated program trades),
- an indication of the traded item to which the first offer relates,
- if the offer is an offer to sell, an indication of whether the offer is long, short or short but exempt from the special rules for short sales;

except that:
- if the first offer is an immediate or cancel offer, the limit price, initial quantity and remaining quantity will not be disclosed publicly (although information about the quantity and price of trades arising out of such an offer will be publicly disclosed) and
- if the first offer must be approved before it can be executed, then the offer matching system generally will not publicly disclose any information about the first offer until it has been approved.

In an exemplary embodiment, once the offer matching system has received a description of a first offer that is associated with a first identifier, the offer matching system will send 1401 to an information publisher a description 1451 of the first offer that includes the first identifier and the information about the first offer that the offer matching system is permitted to disclose publicly.

Once the offer matching system has received descriptions of several offers, then based upon a first description 1152 of a first offer received 1104 by the offer matching system, the offer matching system can select 1110 a different offer that is related in some useful way to the first offer. For example, but not by way of limitation, the offer matching system could select an offer because it satisfies a condition that includes one or more of the following requirements:

- that the first offer executed at least in part against such offer,
- that both the first offer and such offer are for the same traded item,
- that both the first offer and such offer are for the same traded item and for the same side (i.e., both are buy offers or both are sell offers),
- that both the first offer and such offer are for the same traded item, but the first offer and such offer are for opposite sides (i.e., one is an offer to buy and the other is an offer to sell),
- that at a time when the first offer was capable of execution, such offer executed in whole or in part against a different offer, and
- that at a first time when the first offer was capable of execution:
  - such offer executed in whole or in part against a different offer and
  - the first offer could have executed in whole or in part against such different offer in accordance with the set of rules for the offer matching system if the offer matching system had not possessed information concerning any other offers for a same side as the first offer.

The condition used to select such offer could include other requirements that are not listed above, such as, for example, a requirement that the selected offer be capable of being executed in whole or in part at a specified time.

A second participant can use a second participant system 2003 to communicate 1201, 1202 a description 1251 of a second offer to the offer matching system.

The offer matching system can execute 1203 the first offer against the second offer in accordance with a set of rules for the offer matching system. Those skilled in the art will appreciate that there are many different ways that an offer matching system can match and execute offers to buy and to sell. The invention is not limited to a particular method for matching and executing offers in the offer matching system.

In an exemplary embodiment, once the offer matching system executes a first buy offer against a first sell offer, then the rules for the offer matching system, and the offer matching system, will permit information, including, but not limited to the following, to be publicly disclosed about each trade arising out of such execution:

a unique identifier associated with the first buy offer,
the price at which the trade occurred,
the quantity traded,
an indication of the applicable traded item,
a unique identifier associated with the first sell offer,
a unique identifier associated with such trade, and
the time at which the trade occurred.

In an exemplary embodiment, once the offer matching system executes a first buy offer against a first sell offer, then the offer matching system will send 1401 to an information publishing system 2005 a description of the resulting trade that includes the information about the trade that the offer matching system is permitted to disclose publicly.

Someone, including, but not limited to a disclosee or participant, who originates or communicates a description of a first offer may also know one or more of the following:

what identifier is associated with the first offer,
who has a beneficial interest in the first offer,
for whose account the first offer was submitted,
who made the decision to make the first offer,
who has a financial interest in the first offer,
who is financially responsible (as principal, guarantor or otherwise) for the first offer,
who is financially responsible (as principal, guarantor or otherwise) for a trade arising out of the first offer,
who, if anyone, is acting as an agent with respect to the first offer, and
who, if anyone, is acting as a principal with respect to the first offer.

If a person, including, but not limited to a disclosee or participant, possesses information that discloses what identifier is associated with the first offer and discloses any one or more of the following:

who has a beneficial interest in the first offer,
for whose account the first offer was submitted,
who made the decision to make the first offer,
who has a financial interest in the first offer,
who is financially responsible (as principal, guarantor or otherwise) for the first offer,
who is financially responsible (as principal, guarantor or otherwise) for a trade arising out of the first offer,
who, if anyone, is acting as an agent with respect to the first offer, and
who, if anyone, is acting as a principal with respect to the first offer, then such person may confidentially communicate the first identifier to any other person (including, but not limited to, a participant, a disclosee or a monitor) in a way that discloses such information to such other person.

Thus, it is possible for any particular person to know information which discloses that a particular identifier is associated with an order for which some person is in a specified relationship, even if such information has not been publicly disclosed.

If the disclosee possesses information which discloses that a first related person is related in a particular way to an offer that is associated with the first identifier, then the disclosee can communicate 1211, 1212 the first identifier 1255 to a monitor in a manner that discloses that the first related person is so related to an offer associated with the first identifier. For example, but not by way of limitation, if the first disclosee were the treasurer of an investment club and the first offer were an offer submitted for the benefit of the investment club, the first disclosee could tell another member of the club (i.e., the monitor) that the offer associated with the first identifier was submitted on behalf of the club.

Once a person (including, but not limited to a participant, disclosee or monitor) knows that a first identifier is associated with an offer that is of interest to such person, then such person can obtain information about the offer associated with the first identifier in several different ways.

A participant can communicate 1206, 1207 to the offer matching system a request 1253 for information keyed to the first identifier. After receiving 1207 such a request, the offer matching system can communicate 1209, 1210 the desired information 1254 to the participant. The request 1253 from the participant can specify that a response should only be made after some specified event has occurred. For example, but not by way of limitation, the response might be delayed until:

some data item associated with the first offer changes,
the first offer is modified,
the first offer is cancelled,
the first offer expires, or
the first offer is executed by the offer matching system at least in part.

For example, but not by way of limitation, the information requested might include information (a first data item) about a third offer selected 1110 based upon information about the first offer. The first data item may contain information that was communicated to the offer matching system when a description of the third offer was first communicated to the offer matching system; or the first data item may concern an offer against which the third offer was executed at least in part; or the first data item may identify an offer against which the third offer was executed at least in part; or the first data item may identify a transaction report for a trade in which the third offer was executed at least in part.

In one embodiment of the invention:

a first offer is associated with a first identifier, a first requester (including, but not limited to a participant, disclosee or monitor) either possesses or obtains (from a participant, disclosee, monitor or other person) information which discloses that the first identifier is associated with the first offer and that a first related person satisfies a first condition selected from the group consisting of:

the first offer is for the benefit of the first related person,
the first offer is for the account of the first related person,
the first related person made an investment decision to make the first offer,
the first related person has a financial interest in the first offer,
the first related person is financially responsible (as principal, guarantor or otherwise) for the first offer, the first related person is financially responsible (as principal, guarantor or otherwise) for a trade arising out of the first offer, the first related person is acting as an agent with respect to the first offer, and the first related person is acting as a principal with respect to the first offer.

The first requester sends 1206, 1301, 1306, 1405, 1501, 1506 a first request 1253, 1351, 1353, 1453, 1551, 1553 that includes the first identifier to an offer matching system or to an information publishing system. If the first request indicates that the first requester wishes to be notified when a first event occurs, then the offer matching system or information publisher, as the case may be, waits 1208, 1303, 1308, 1407, 1503, 1508 for the first event to occur, without determining that the first request was made by a person entitled to receive confidential information concerning the first offer, the offer matching system or information publishing system, as the case may be, sends 1209, 1215, 1304, 1309, 1408, 1504, 1509 and the first requester receives 1210, 1216, 1305, 1310, 1409, 1505, 1510 a response 1254, 1257, 1352, 1354, 1454, 1552, 1554 that includes a first data item which concerns the first offer and is responsive to the first request, whereby, the first requester, which already possesses information which discloses that the first related person satisfies the first condition, gains possession of information which discloses that the first data item concerns the first offer.

In another embodiment of the invention, a first offer is associated with a first identifier, a first requester (including, but not limited to a participant, disclosee or monitor) either possesses or obtains (from a participant, disclosee, monitor or other person) information which discloses that the first identifier is associated with the first offer and that a first related person satisfies a first condition selected from the group consisting of:

the first offer is for the benefit of the first related person, the first offer is for the account of the first related person, the first related person made an investment decision to make the first offer, the first related person has a financial interest in the first offer, the first related person is financially responsible (as principal, guarantor or otherwise) for the first offer, the first related person is financially responsible (as principal, guarantor or otherwise) for a trade arising out of the first offer, the first related person is acting as an agent with respect to the first offer, and the first related person is acting as a principal with respect to the first offer.

The first requester then sends 1206, 1301, 1306, 1405, 1501, 1506 a first request 1253, 1351, 1353, 1453, 1551, 1553 that includes the first identifier to an offer matching system or to an information publishing system. Based upon information about the first offer possessed by the offer matching system or the information publishing system, as the case may be, the offer matching system or the information publishing system selects a third offer that satisfies a second condition, the second condition comprising a requirement selected from the group consisting of:

that the first offer executed at least in part against the third offer, that both the first offer and the third offer are for a single traded item, that both the first offer and the third offer are for a single traded item and a side, that both the first offer and the third offer are for a single traded item, the first offer is for a first side and the third offer is not for the first side, that at a time when the first offer was capable of execution, the third offer executed in whole or in part against a third offer, wherein the third offer is not the first offer, and that at a first time when the first offer was capable of execution:

the third offer executed in whole or in part against a fourth offer, wherein the fourth offer is not the first offer, or the first offer could have executed in whole or in part against the fourth offer in accordance with the set of rules if the offer matching system had not possessed information concerning any other offers for a same side as the first offer.

If the first request indicates that the first requester wishes to be notified when a first event occurs, then the offer matching system or information publisher, as the case may be, waits 1208, 1303, 1308, 1407, 1503, 1508 for the first event to occur.

Without determining that the first request was made by a person entitled to receive confidential information concerning the third offer, the offer matching system or information publishing system, as the case may be, sends 1209, 1215, 1304, 1309, 1408, 1504, 1509 and the first requester receives 1210, 1216, 1305, 1310, 1409, 1505, 1510 a response 1254, 1257, 1352, 1354, 1454, 1552, 1554 that includes a first data item which concerns the third offer and is responsive to the first request.

In this way, the first requester, which already possesses information which discloses that the first related person satisfies the first condition, gains possession of information which discloses that the first data item concerns the third offer which satisfies the second condition.

It will be appreciated that in accordance with the invention, reports could be sent to the investor, to someone tracking the investor's credit and risk exposure, or to each member of an investment club. Such reports' use would depend upon knowledge of the relationship between an identifier and its respective offer.

The present invention allows an investor conveniently to monitor how quickly and accurately the investor's broker processes an offer initiated by the investor. For example, the investor (the disclosee) can send a description of the offer to the investor's broker (the participant) who forwards a description of the offer to an offer matching system. The offer matching system associates an offer identifier with the offer and communicates the offer identifier to the investor's broker. The investor's broker then communicates the offer identifier to the investor. Once the investor knows the offer identifier associated with the offer, the investor can visit a web site operated by the offer matching system or by an information publisher that obtains information from the offer matching system and ask for information based upon the offer identifier. For example, if the investor asks the offer matching system or an information publisher for a desecration of the offer associated with the offer identifier, the investor could find out when the offer was received by the offer matching system and the price and quantity that were specified in the description received by the offer matching system. Thus the investor could monitor how quickly the investor's broker submitted the investor's order to the offer matching system and could confirm that the investor's broker submitted the correct price and quantity. Although anyone could query the offer matching system or the information publisher using the office identifier, only a few people would know that the investor has any interest in the offer associated with the offer identifier.

The present invention also allows an investor conveniently to monitor the status of an offer initiated by the investor. Once the investor knows the offer identifier associated with the investor's offer, the investor can visit a web site operated by the offer matching system or an information publisher and ask to receive an e-mail notice each time the offer is executed in whole or in part. Although anyone could ask to receive notices when such offer executes, only a few people would know that trades described in such notices are financially relevant to the investor. The present invention allows the investor to obtain such notices without requiring the investor to use a broker that operates a system for providing such notices.

The present invention also allows an investor to permit others conveniently to monitor the status of an offer initiated by the investor. For example, the treasurer of an investment club could submit an offer as described above, and then send to each member of the investment club an e-mail that contains the offer identifier. Each member of the investment club could then obtain information about the offer and executions of the offer by directly querying the offer matching system or an information publisher.

The present invention permits an investor to obtain information about other offers that are related in some interesting way to an offer initiated by the investor. Consider, for example, an investor who observes on a ticker-type display that trades for a stock he wants to buy are occurring at prices below the limit price specified in a buy offer previously submitted to the offer matching system. The investor will want to know why his offer has not yet executed. In such a case, the investor could visit a web site operated by the offer matching system or an information publisher, supply the offer identifier for the investor's buy offer, and ask for information about trades of the relevant stock that have occurred at prices below the limit price specified in his order. The offer matching system or information publisher could then list such trades and explain why the buy offers involved in those trades had priority over the investor's buy order (e.g., the other offers specified a higher limit price, were submitted sooner, were for a larger initial quantity, etc.—whatever factor gave them a higher execution priority). The investor might also want to know about active buy offers that have an execution priority that is higher than the investor's buy offer (i.e., offers that must be filled before the investor's offer can be executed). Once again, given the offer identifier for the investor's buy offer, the offer matching system or information publisher could provide information about prices and quantities specified in higher priority offers for the same security.

The present invention permits a participant to obtain information about other offers that are related in some interesting way to an offer submitted to the offer matching system by the participant. In essentially the same way that an investor who knows an offer identifier can obtain information about other offers with higher execution priority, a participant can obtain the same information.

The present invention permits a bank to monitor a borrower's risk exposure arising out of offers submitted to an offer matching system. For example, a bank (the monitor) that wants to track a borrower's (the disclosee's) risk exposure arising from offers submitted to the offer matching system, could refuse to lend to the borrower until the borrower causes the borrower's broker (the participant) to cause the offer matching system to save an association among the bank, the borrower and the condition that the borrower is financially responsible for an offer. The bank and the offer matching system would also agree upon a procedure by which the bank could identify itself to the offer matching system. Subsequently, the borrower sends a description of an offer to the borrower's broker who forwards it to the offer matching system together with information that the offer is for the account of the borrower. The offer matching system detects that the offer satisfies the condition. If the bank logs onto the offer matching system in a way that permits the offer matching system to recognize the bank and the bank submits a request for information about offers for which the borrower is financially responsible, the exchange can then provide the requested information to the bank. Thus the invention permits the bank to obtain information relevant to evaluating risks to which the borrower is exposed.

In a related embodiment of the invention there would be no need to submit a request. Instead, the offer matching system simply sends to the bank information about offers submitted for the borrower's account.

The present invention also permits an investor (the disclosee) to obtain through the investor's broker (the participant) information concerning an offer that is digitally signed by an offer matching system. Consider for example a case where the investor communicates an offer to the investor's broker who then communicates it to the offer matching system. Subsequently, the investor can ask the broker for information about when the offer was received by the offer matching system. The investor can ask the offer matching system for the desired information. The offer matching system can provide the desired information (either directly to the investor or to the broker who can forward it to the investor) and provide a digital signature which certifies that the information was provided by the offer matching system. Thus, the invention permits the investor to monitor the performance of the investor's broker with respect to offers forwarded to the offer matching system without requiring the investor to communicate directly with the offer matching system.

The present invention permits an offer matching system to respond to queries about offers previously received by the offer matching system without requiring the offer matching system to know or to verify the identify of the individual making the query. Because the offer matching system does not provide information that discloses who submitted a particular order, providing information about an offer does not violate the privacy expectations of an investor. An investor need only take reasonable steps to preserve the confidentiality of information disclosing which offer identifiers are associated with offers in which the investor has a financial interest. The investor does not even need to identify itself to the offer matching system to obtain information about the investor's own offers.

The present invention permits an offer matching system to respond to queries about offers that are somehow relevant to an offer identified by the person requesting information.

The present invention permits an information publisher to provide and pay for the facilities that permit investors and others to obtain information about offers received and processed by the offer matching system.

The information publisher could charge investors for providing such a service or could charge for advertisements that are displayed to persons who obtain such information.

The invention permits an information publisher to provide and pay for the facilities that respond to queries for information about offers that are somehow relevant to an offer that is of interest to an investor or any other person.

Several different communications technologies (including, but not limited to ADSL, cable modems, broadcast media such as radio and television, Internet multicasting, etc.) permit the very efficient distribution of information from a single source to multiple recipients. The invention allows such technologies to be utilized to distribute information about offers and trades that is tagged with relevant offer identifiers. Persons receiving such broadcasts can then filter the received information based upon offer identifiers to identify information that is of interest to the recipient.

The problem with existing methods for distributing information about offers and trades is that they either require secure communication links so that the offer matching system can confirm that the recipient is entitled to receive requested information or they publish information that is not tagged with offer identifiers so that a recipient can not be sure that any particular item of information concerns an offer that is of interest to the recipient. A recipient using a prior-art system might, for example, see that someone just bought 100 shares of Acme common for a price that is compatible with his or her offer, but would not know if that trade represents an execution of his or her offer or an execution of some other offer that was submitted before his or her offer.

The invention permits an investor to obtain information about an offer initiated by the investor by filtering data published by an offer matching system or an information publisher. For example, an investor (the disclosee) submits an offer to the investor's broker (the participant) who forwards the offer to the offer matching system. The offer matching system associates an identifier with the offer and the identifier is communicated from the offer matching system to the broker to the investor. The offer matching system, or an information publisher that receives data tagged with offer identifiers from the offer matching system, then publishes the offer identifier together with data about the offer. Such information could be provided either only to subscribers or could be broadcast to the public. The offer matching system or information publisher could publish similar information about many different offers. The investor can then receive the published information and filter it for information that is tagged with the offer identifier. Thus, the invention permits an investor (or anyone to whom the investor discloses the relevant offer identifier) to obtain information about orders that are of interest to the investor (or such person) without sending a request for information to the offer matching system or an information publisher and without revealing to anyone that the recipient is interested in a particular offer.

The invention permits an investor to obtain information about offers that are related in an interesting way to an offer initiated by the investor. For example, the investor (the disclosee) submits a first buy offer for a traded item to the investor's broker (the participant) who forwards the first buy offer to the offer matching system. An identifier associated with the first offer is communicated to the investor. The offer matching system or an information publishing system subsequently publishes information about other offers to buy the same traded item. The investor's computer receives such information and stores it because it concerns a security that the investor wishes to buy. The offer matching system or an information publishing system then publishes information about trades involving the security that the investor wants to buy at prices that are below the maximum price that the investor is willing to pay. The information about such trades includes offer identifiers for the buy offers involved in such trades (which are not the same as the offer identifier for the first offer). The investor's computer can see the offer identifier of the buy offer involved in such a trade, can retrieve previously stored information about such offer and can display for the investor a notice that such trade occurred and information about such offer so that the investor can see why the other offer was executed before the investor's buy offer was executed.

The invention permits the offer matching system to publish data about offers in a manner that does not require the offer matching system to respond to multiple queries from the public because the public can simply filter information published once by the offer matching system. This saves communication bandwidth.

The invention permits an investor to know whether a particular trade reported by a ticker service did or did not arise out of an offer originated by the investor. An investor who knows that a first offer identifier is associated with an offer initiated by the investor can monitor ticker data that is tagged with the offer identifier of each buy offer and sell offer that is involved in a reported trade. If data about a trade is tagged with the first offer identifier, then the investor knows that the data concerns a trade arising out of the offer initiated by the investor. Otherwise, the investor knows that the data concerns a trade that did not arise out of the offer initiated by the investor.

Those skilled in the art will realize that the invention thus permits efficient communication to multiple investors of information that is of particular interest to them without requiring multiple secure data connections and the overhead of multiple queries.

The invention permits an investor to signal to the market that the decision to initiate an offer was not based upon information that has not yet become widely known by investors. For example, an investor who wishes to sell a block of a thinly traded stock to fund the purchase of a new home, could submit an offer to sell the block at an attractive price with the stipulation that the offer could not be executed for several days. In such a scenario, other persons interested in the affected security will have several days to adjust to the idea that someone (whose identity is not revealed) wishes to sell the block of stock. By the time the investor's sell offer becomes effective, other investors will have had time to realize that the investor probably is not trading based upon superior information because the investor announced his intention to trade several days before the trade will actually occur. Also, persons with an interest in purchasing the affected security will have had several days to realize that a large, attractively priced block is going to become available for purchase at the delayed effective time specified by the investor.

The invention permits anyone who is willing to deal with a large number of small trades to obtain any price differential that might exist between round lots and odd lots. For example, a patient seller with efficient systems for processing trades might wish to submit a large offer to sell at a high price that is marked to indicate that the seller is willing to permit round lots to be broken into odd lots. If persons who wish to purchase odd lots of the relevant security should indicate a willingness to pay a somewhat high price to obtain the desired odd lot, then it might be possible for the patient seller to sell at the high prices that odd lot purchasers are willing to pay.

The invention thus permits competition for odd lot trades in the hopes of inducing competition for odd lot trades that may result in small spreads between the prices for odd lot trades and for round lot trades.

The invention permits a participant to reduce the risk that compromising physical security of a single computer system could expose the participant to large risks. If the systems that are authorized to approve offers are located remotely from the computers that are used to submit offers to the offer matching system, then it would be possible for the approving system to refuse to approve unusual offers that might be submitted by someone who wrongfully takes control of the submitting computers. The invention would also permit risk management or compliance personnel at a participant to block prohibited offers that other personnel at the participant might submit to the offer matching system.

The invention attempts to reduce price volatility in the manner that it selects a trade price. Consider the case where a buyer with a strong desire to purchase Acme common submits a buy order that specifies a limit price that is well above the last trade price and a seller with a strong desire to sell Acme common submits a sell order that specifies a limit price that is well below the last trade price. When the offer matching system detects that these two offers can be executed against one another, it must select a price at which the trade will be executed. According to the invention, the offer matching system will select a price that is indicative of recent trading activity in the applicable security, which should tend to reduce unnecessary price movements. Thus, the enthusiastic buyer who is willing to pay a high price will only need to pay a market-related price and the rushed seller who is willing to accept a low price will actually receive a market-related price.

The invention permits a short seller to enter a single limit offer that specifies the lowest price the short seller is willing to accept, even if that price is (or becomes) less than the minimum price permitted for short sales. Each time the offer matching system examines the single limit offer to see whether it can be executed, the offer matching system will treat the single limit offer as though it were an offer at the greater of the specified limit price and the minimum price permitted for short sales. This can reduce the number of times that a short seller might adjust an offer to sell short to reflect trading activity that changes the minimum price permitted for short sales.

The majority of securities transactions in the US are cleared and/or settled through the facilities of a nonprofit membership organization named the National Securities Clearing Corporation ("NSCC"). For trades that clear and/or settle through its facilities, NSCC typically charges a per transaction fee that is independent of the number of shares or the dollar amount involved in the trade. If trades arising out of an offer matching system are cleared and settled directly between the participants who submit offers to the offer matching system, then the allocation of NSCC fees can present some interesting problems. There is not a similar problem for offer matching systems where all trades are executed with a single designated intermediary, because in such a case all trades arising out of a single offer can be aggregated into a single trade with the designated intermediary. For example, consider the case where a first participant submits an offer to sell 1000 shares that executes against 10 different offers to purchase 100 shares. In such a case, the seller will be involved in 10 trades and each buyer will be involved in a single trade. It would be undesirable for the seller to pay more fees to NSCC than the buyers do because the seller would have been willing (and probably would have preferred) to do a single trade for the full 1000 shares. The invention proposes a method for collecting fees from each participant that benefits by having at least part of an offer executed, and then paying (either directly or by reimbursing the affected participants) the NSCC fees applicable to trades executed by the offer matching system. For example, the offer matching system could collect fees from each participant and then pay fees directly to NSCC.

As mentioned earlier, when using the internet in connection with business transactions, it is desirable to utilize a secure hypertext transport protocol between a client computer system running a browser program and a server computer system running a server program.

To reduce the risk that unauthorized users will interfere with the operation of client computer systems connected to the Internet, it is often desirable to insert a "firewall" computer system between client computers running browser programs and the Internet. It is typical to configure firewall computer systems to prohibit certain types of communication between the Internet and a client computer system. Sometimes firewall computer systems are configured to block all communications unless an attempted communication is contained in a list of permitted communications.

It is possible to configure a firewall computer system so that it will pass attempts by a client computer system running a browser to establish a link over the Internet to port 80 on a server computer (which is the port normally used for hypertext transport protocol), but will block attempts to establish such a link to port 443 (which is the port normally used for the popular secure sockets protocol).

Unfortunately, configuring a firewall computer system in such a way makes it difficult for client computers connected to the firewall computer system to utilize the secure socket layer for secure communication over the Internet.

As described below, this problem can be overcome by configuring the server computer to use port 80 for secure sockets and by directing the client computer to use port 80 to establish a secure link with the server computer.

In a preferred embodiment of the invention, the server computer is an International Business Machines Personal Computer compatible system that is running Microsoft Windows NT 4.0 operating system, Microsoft Internet Information Server Version 4.0 and Microsoft Certificate Server.

Following normal setup procedures on the server computer system, establish a web server at a desired internet protocol address (for illustrative purposes only, the discussion below uses address 10.0.0.1, however, those familiar with the art will understand that any desired valid internet protocol address can be used) that supports both normal hypertext transport protocol sessions on port 80 and secure socket layer sessions on port 443. This will normally require using key manager to associate a server certificate with the virtual server. Create a default web page on the virtual server and test the installation by using a client computer running a browser such as Microsoft Internet Explorer version 4.0 to browse to the default web page using both the normal universal resource locator (the normal URL) of "http://10.0.0.1" and the secure socket layer universal resource locator (the SSL URL) of "https://110.0.0.1".

On the server computer, start Microsoft Management Console for Microsoft Internet information server, navigate in the left panel to Console Root\Internet Information Server\<server name>\<virtual server name>, where <server name> is replaced with the name of the server being used and <virtual server name> is replaced with the name of the virtual server being used. Right click on the icon for <virtual server name>, left click on properties in the popup menu. In the form for Properties, select the web site tab and make the following changes:

change the TCP Port from 80 to any value other than 80 or 443 (for example, 8080); and change the SSL Port to 80.

Left click Apply, Left click OK. Shutdown and restart the server computer.

On the client computer, browse to the default page using the modified secure socket layer universal URL (the modified URL) of "https://10.0.0.1:80". Note that the browser establishes a secure link to the server computer using port 80 on the server computer.

Those familiar with the art will appreciate that the modified URL can be used in many ways that are typical for universal resource locators. For example, but not by way of limitation, the modified URL can be used in hypertext markup language as part of:

the target for a hyperlink, e.g.: '<a href="https://10.0.0.1:80/default.htm"> click for link</a>';

the action for a form, e.g., '<form method="POST" action="https://10.0.0.1:80/dump.asp"> <p> <input type="text" name="T1" size="20"> <input type="submit" value="Submit" name="B1"> <input type="reset" value="Reset" name="B2"> </p> </form>'; and query, e.g.: '<a href="https://10.0.0.1:80/dump.asp?parameter=value"> click for query</a>'.

Those skilled in the art can readily devise obvious variations on the various embodiments of the invention as set forth above. Any and all such variations are intended to be encompassed within the scope of the invention, which is defined by the claims which follow.

The invention claimed is:

1. A method for operating an offer matching system comprising the following steps:
    (a) receiving from a first participant a first description of a first offer;
    (b) associating the first offer with a first identifier, the first identifier not associated with any offer other than the first offer;
    (c) if the first description did not disclose the first identifier, sending the first identifier to the first participant in a manner that discloses to the first participant that the first identifier is associated with the first offer;
    (d) receiving from a second participant a description of a second offer;
    (e) the offer matching system's executing the first offer at least in part against the second offer in accordance with a set of rules that govern the operation of the offer matching system;
    (f) receiving from a first disclosee a first request for information, the first request includes the first identifier, wherein
        the first disclosee is not the same as the first participant and
        the first disclosee possesses information which discloses that a first related person satisfies a first condition, wherein the first condition is selected from the group consisting of:
            the first offer is for the benefit of the first related person,
            the first offer is for the account of the first related person,
            the first related person made an investment decision to make the first offer,
            the first related person has a financial interest in the first offer,
            the first related person is financially responsible (as principal, guarantor or otherwise) for the first offer,
            the first related person is financially responsible (as principal, guarantor or otherwise) for a trade arising out of the first offer,
            the first related person is acting as an agent with respect to the first offer, and
            the first related person is acting as a principal with respect to the first offer;
    (g) selecting a third offer that satisfies a second condition, the second condition comprising a requirement selected from the group consisting of:
        that the first offer executed at least in part against the third offer,
        that both the first offer and the third offer are for a single traded item,
        that both the first offer and the third offer are for a single traded item and a single side,
        that both the first offer and the third offer are for a single traded item, the first offer is for a first side and the third offer is not for the first side,
        that at a time when the first offer was capable of execution, the third offer executed in whole or in part against a fourth offer, wherein the fourth offer is not the first offer, and
        that at a first time when the first offer was capable of execution: the third offer executed in whole or in part against a fifth offer, wherein the fifth offer is not the first offer, the first offer could have executed in whole or in part against the fifth offer in accordance with the set of rules if the offer matching system had not possessed information concerning any other offers for a same side as the first offer; and
    (h) in response to the first request, and without the offer matching system's determining that the first request is from a person entitled to receive confidential information concerning the third offer, sending to the first disclosee a first data item concerning the third offer, whereby the first disclosee, which already possesses information which discloses that the first related person satisfies the first condition, gains possession of information which discloses that the first data item concerns the third offer which satisfies the second condition.

2. The method of claim 1 wherein:
    under the set of rules, the offer matching system is permitted to disclose publicly that the first data item concerns the third offer, and
    under the set of rules, the offer matching system is not permitted to disclose publicly that the first related person satisfies the first condition.

3. The method of claim 1 wherein before step (f) the first disclosee receives from the first participant information which discloses that the first related person satisfies the first condition.

4. The method of claim 1 wherein:
    a second disclosee receives from the first participant information which discloses that the first related person satisfies the first condition and
    the first disclosee receives from the second disclosee information which discloses that the first related person satisfies the first condition.

5. The method of claim 4 wherein the second disclosee is the same as the first related person.

6. The method of claim 4 wherein the first description is based upon a description of the first offer received by the first participant from the second disclosee.

7. The method of claim 1 wherein the first related person is selected from the group consisting of:
    the first participant, and
    the first disclosee.

8. The method of claim 1 wherein:
    the first request [1351] comprises a requirement that a first event occur, the first event being selected from the group consisting of:
        that a second data item associated with the first offer changes, that the first offer is modified,
that the first offer is cancelled,
that the first offer expires, and
that the first offer is executed by the offer matching system at least in part, and step (h) is not performed until after the first event occurs [1303].

9. The method of claim 1 wherein a predetermined relationship exists between the first data item and the third offer, wherein the predetermined relationship is selected from the group consisting of:
the first data item contains information that was communicated to the offer matching system when a description of the third offer was first communicated to the offer matching system,
the first data item concerns an offer against which the third offer was executed at least in part,
the first data item identifies an offer against which the third offer was executed at least in part, and
the first data item identifies a transaction report for a trade in which the third offer was executed at least in part.

10. The method of claim 1 wherein only round lot quantities are considered when determining whether the third offer satisfies the second condition.

11. The method of claim 1 wherein the second condition further comprises a requirement that the third offer has a higher execution priority than the first offer.

12. A method for operating an information publishing system comprising the following steps:
(a) receiving [1402] from an offer matching system a first description [1451] of a first offer, wherein:
the first description includes a first identifier associated with the first offer,
the first identifier not associated with any offer other than the first offer,
(b) receiving [1502] a first request [1551] for information, the first request includes the first identifier, from a first disclosee, wherein:
the first disclosee did not previously send a description of the first offer to the offer matching system and
the first disclosee possesses information which discloses that a first related person satisfies a first condition, wherein the first condition is selected from the group consisting of:
the first offer is for the benefit of the first related person,
the first offer is for the account of the first related person,
the first related person made an investment decision to make the first offer,
the first related person has a financial interest in the first offer,
the first related person is financially responsible (as principal, guarantor or otherwise) for the first offer,
the first related person is financially responsible (as principal, guarantor or otherwise) for a trade arising out of the first offer,
the first related person is acting as an agent with respect to the first offer, and
the first related person is acting as a principal with respect to the first offer,
(c) in response to the first request, and without the information publishing system's determining that the first request is from a person entitled to receive confidential information concerning the first offer, sending [1504] to the first disclosee a first data item [1552], wherein:
the first data item concerns the first offer, and
before receiving the first data item, the first disclosee does not possess information which discloses that the first data item concerns the first offer,
whereby the first disclosee, which already possesses information which discloses that the first related person satisfies the first condition, gains possession of information which discloses 5 that the first data item concerns the first offer.

13. The method of claim 12 wherein:
under a set of rules that govern the operation of the offer matching system, the offer matching system is permitted to disclose publicly that the first data item concerns an offer associated with the first identifier, and
under the set of rules, the offer matching system is not permitted to disclose publicly that the first related person satisfies the first condition.

14. The method of claim 12 wherein the first disclosee received information which discloses that the first related person satisfies the first condition from a first participant and the first participant sent [1103] a description [1152] of the first offer to the offer matching system before step (a) was performed.

15. The method of claim 12 wherein:
the first disclosee received information which discloses that the first related person satisfies the first condition from a second disclosee,
the second disclosee received information which discloses that the first related person satisfies the first condition from a first participant,
and the first participant sent a description of the first offer to the offer matching system.

16. The method of claim 12 wherein:
the first request comprises a requirement that a first event occur, the first event being selected from the group consisting of:
that a second data item associated with the first offer changes,
that the first offer is modified,
that the first offer is cancelled,
that the first offer expires, and
that the first offer is executed by the offer matching system at least in part, and step (c) is not performed until after the first event occurs [1503].

17. The method of claim 12 wherein a predetermined relationship exists between the first data item and a second offer against which the first offer was executed at least in part, wherein the predetermined relationship is selected from the group consisting of:
the first data item concerns the second offer,
the first data item identifies the second offer, and
the first data item identifies a transaction report for a trade in which the first offer was executed against the second offer at least in part.

18. A method for operating an information publishing system comprising the following steps:
(a) receiving from an offer matching system a description of a first offer, wherein:
the first description includes a first identifier associated with the first offer,
the first identifier not associated with any offer other than the first offer;
(b) receiving from an offer matching system a description of a second offer;
(c) receiving a first request for information, the first request includes the first identifier, from a first disclosee, wherein the first disclosee did not previously send a description of the first offer to the offer matching system and the first disclosee possesses information which discloses that a first related person satisfies a first condition, wherein the first condition is selected from the group consisting of:

the first offer is for the benefit of the first related person, the first offer is for the account of the first related person, the first related person made an investment decision to make the first offer, the first related person has a financial interest in the first offer, the first related person is financially responsible (as principal, guarantor or otherwise) for the first 'offer, the first related person is financially responsible (as principal, guarantor or otherwise) for a trade arising out of the first offer, the first related person 'is acting as an agent with respect to the first offer, and the first related person is acting as a principal with respect to the first offer;

(d) determining that the second offer satisfies a second condition that comprises a requirement selected from the group consisting of:

that the first offer executed at least in part against the second offer, that both the first offer and the second offer are for a single traded item, that both the first offer and the second offer are for a single traded item and a side, that both the first offer and the second offer are for a single traded item, the first offer is for a first side and the second offer is not for the first side, that at a time when the first offer was capable of execution, the second offer executed in whole or in part against a third offer, wherein the third offer is not the first offer, and that at a first time when the first offer was capable of execution: the second offer executed in whole or in part against a fourth offer, wherein the fourth offer is not the first offer, and the first offer could have executed in whole or in part against the fourth offer in accordance with the set of rules if the offer matching system had not possessed information concerning any other offers for a same side as the first offer;

(e) in response to the first request, and without the information publishing system's determining that the first request is from a person entitled to receive confidential information concerning the second offer, sending to the first disclosee a first data item concerning the second offer, whereby the first disclosee, which already possesses information which discloses that the first related person satisfies the first condition, gains possession of information which discloses that the first data item concerns the second offer which satisfies the second condition.

19. The method of claim 18 wherein:

under the set of rules, the offer matching system is permitted to disclose publicly that the first data item concerns the second offer, and under the set of rules, the offer matching system is not permitted to disclose publicly that the first related person satisfies the first condition.

20. The method of claim 18 wherein the first disclosee received information which discloses that the first related person satisfies the first condition from a first participant and the first participant sent a description of the first offer to the offer matching system before step (a) was performed.

21. The method of claim 18 wherein:

the first disclosee received information which discloses that the first related person satisfies the first condition from a second disclosee, the second disclosee received information which discloses that the first related person satisfies the first condition from a first participant, and the first participant sent a description of the first offer to the offer matching system before step (a) was performed.

22. The method of claim 18 wherein:

the first request comprises a requirement that a first event occur, the first event being selected from the group consisting of:

that a second data item associated with the first offer changes, that the first offer is modified, that the first offer is cancelled, that the first offer expires, and that the first offer is executed by the offer matching system at least in part, and step (e) is not performed until after the first event occurs [1503].

23. The method of claim 18 wherein a predetermined relationship exists between the first data item and the second offer, wherein the predetermined relationship is selected from the group consisting of:

the first data item concerns the second offer, the first data item identifies the second offer, and the first data item identifies a transaction report for a trade in which the first offer was executed against the second offer at least in part.

24. A method for interacting with an offer matching system comprising the following steps:

(a) communicating [1103,1104] from a first participant to the offer matching system a first description [1152] of a first offer;

(b) associating [1105] the first offer with a first identifier, the first identifier not associated with any offer other than the first offer;

(c) if the first description does not disclose the first identifier, then communicating [1106,1107] the first identifier [1153] from the offer matching system to the first participant in a manner that discloses to the first participant that the first identifier is associated with the first offer;

(d) communicating [1201,1202] from a second participant to the offer matching system a description [1251] of a second offer;

(e) the offer matching system's executing [1203] the first offer at least in part against the second offer in accordance with a set of rules that govern the operation of the offer matching system;

(f) if a first disclosee does not already possess information which discloses that the first identifier is associated with the first offer and that a first related person satisfies a first condition selected from the group consisting of:

the first offer is for the benefit of the first related person, the first offer is for the account of the first related person, the first related person made an investment decision to make the first offer, the first related person has a financial interest in the first offer, the first related person is financially responsible (as principal, guarantor or otherwise) for the first offer, the first related person is financially responsible (as principal, guarantor or otherwise) for a trade arising out of the first offer, the first related person is acting as an agent with respect to the first offer, and the first related person is acting as a principal with respect to the first offer, then, after the first participant possesses information which discloses that the first identifier is associated with the first offer, communicating [1112,1113,1114] the first identifier from the first participant to the first disclosee in a manner which discloses to the first disclosee that the first related person satisfies the first condition;

(g) attempting to avoid public disclosure of information that is reasonably likely to disclose that the first related person satisfies the first condition; and (h) the offer matching system's publishing [1605] a first data packet [1652] that comprises the first identifier and a first data item, wherein:

the first data item concerns the first offer, the data packet is published in a manner that permits the first disclosee to receive it regardless of whether the first disclosee has a right to receive confidential information concerning the first offer, and prior to publication of the first data packet, the first disclosee does not possess information which discloses that the first data item concerns the first offer; and (i) the first disclosee's receiving [1606] the first data packet and detecting [1607] that the first data packet includes the first identifier, whereby the first disclosee, which already possesses information which discloses that the first related person satisfies the first condition, gains possession of information which discloses that the first data item concerns the first offer.

25. The method of claim 24 wherein:

under the set of rules, the offer matching system is permitted to disclose publicly that the first data item concerns an offer associated with the first identifier and under the set of rules, the offer matching system is not permitted to disclose publicly that the first related person satisfies the first condition.

26. The method of claim 24 wherein step (f) comprises:

communicating the first identifier from the first participant to a second disclosee in a manner which discloses to the second disclosee that the first related person satisfies the first condition, and communicating the first identifier from the second disclosee to the first disclosee in a manner which discloses to the first disclosee that the first related person satisfies the first condition.

27. The method of claim 24 wherein the first related person is selected from the group consisting of:

the first participant, and the first disclosee.

28. The method of claim 24 with the following additional steps:

before step (a), communicating [1101,1102] from the first disclosee to the first participant a second description [1151] of the first offer; and after step (i), the first disclosee's comparing [1608] the first data item to the second description.

29. The method of claim 24 wherein a predetermined relationship exists between the first data item and the second offer, wherein the predetermined relationship is selected from the group consisting of:

the first data item concerns the second offer, the first data item identifies the second offer, and the first data item identifies a transaction report for a trade in which the first offer was executed against the second offer at least in part.

30. A method for interacting with an offer matching system comprising the following steps:

(a) communicating [1103,1104] from a first participant to the offer matching system a first description [1152] of a first offer;

(b) associating [1105] the first offer with a first identifier, the first identifier not associated with any offer other than the first offer;

(c) if the first description does not disclose the first identifier, then communicating [1106,1107] the first identifier [1153] from the offer matching system to the first participant in a manner that discloses to the first participant that the first identifier is associated with the first offer;

(d) communicating [1201,1202] from a second participant to the offer matching system a description [1251] of a second offer;

(e) the offer matching system's executing [1203] the first offer at least in part against the second offer in accordance with a set of rules that govern the operation of the offer matching system;

(f) if a first disclosee does not already possess information which discloses that the first identifier is associated with the first offer and that a first related person satisfies a first condition selected from the group consisting of:

the first offer is for the benefit of the first related person, the first offer is for the account of the first related person, the first related person made an investment decision to make the first offer, the first related person has a financial interest in the first offer, the first related person is financially responsible (as principal, guarantor or otherwise) for the first offer, the first related person is financially responsible (as principal, guarantor or otherwise) for a trade arising out of the first offer, the first related person is acting as an agent with respect to the first offer, and the first related person is acting as a principal with respect to the first offer, then, after the first participant possesses information which discloses that the first identifier is associated with the first offer, communicating [1108,1109] the first identifier [1154] from the first participant to the first disclosee in a manner which discloses to the first disclosee that the first related person satisfies the first condition;

(g) attempting to avoid public disclosure of information which discloses that the first related person satisfies the first condition;

(h) communicating [1401,1402] from the offer matching system to a first information publisher a first data packet [1451] that comprises the first identifier and a first data item, the first data item concerning the first offer;

(i) the first information publisher's publishing [1705] a second data packet [1752] comprising the first identifier and a second data item, wherein:

the second data item concerns the first offer, the second data packet is published in a manner that permits the first disclosee to receive it regardless of whether the first disclosee has a right to receive confidential information concerning the first offer, and prior to publication of the second data packet, the first disclosee does not possess information which discloses that the second data item concerns the first offer;

(j) the first disclosee's receiving [1706] the second data packet [1752] and detecting [1707] that the second data packet includes the first identifier, whereby the first disclosee, which already possesses information which discloses that the first related person satisfies the first condition, gains possession of information which discloses that the first data item concerns the first offer.

31. The method of claim 30 wherein:
under the set of rules, the offer matching system is permitted to disclose publicly that the first data item concerns an offer associated with the first identifier and
under the set of rules, the offer matching system is not permitted to disclose publicly that the first related person satisfies the first condition.

32. The method of claim 30 wherein the offer matching system does not communicate to the first information publisher any information that the set of rules prohibits the offer matching system from disclosing publicly.

33. The method of claim 30 wherein step (f) comprises:
communicating the first identifier from the first participant to a second disclosee in a manner which discloses to the second disclosee that the first related person satisfies the first condition, and
communicating the first identifier from the second disclosee to the first disclosee in a manner which discloses to the first disclosee that the first related person satisfies the first condition.

34. The method of claim 30 wherein the first related person is selected from the group consisting of:
the first participant, and
the first disclosee.

35. The method of claim 30 with the following additional steps:
before step (a), communicating [1101,1102] from the first disclosee to the first participant a second description [1151] of the first offer; and
after step (j), the first disclosee's comparing [1708] the first data item to the second description.

36. The method of claim 30 wherein the second data item satisfies a predetermined requirement, wherein the predetermined requirement is selected from the group consisting of:
the second data item identifies a transaction report for a trade in which the first offer was executed at least in part,
the second data item concerns the second offer,
the second data item identifies the second offer,
the second data item contains information that was communicated to the offer matching system in step (a),
the second data item is the same as the first data item,
the second data item contains information that was calculated by the first information publisher,
the second data item contains information that was calculated by the first information publisher based at least in part upon information not received from the offer matching system.

37. A method for interacting with an offer matching system comprising the following steps:
(a) communicating from a first participant to the offer matching system a first description of a first offer;
(b) associating the first offer with a first identifier, the first identifier not associated with any offer other than the first offer;
(c) if the first description does not disclose the first identifier, then communicating the first identifier from the offer matching system to the first participant in a manner that discloses to the first participant that the first identifier is associated with the first offer;
(d) communicating from a second participant to the offer matching system a description of a second offer;
(e) the offer matching system's executing the first offer at least in part against the second offer in accordance with a set of rules that govern the operation of the offer matching system;
(f) if a first disclosee does not already possess information which discloses that the first identifier is associated with the first offer and that a first related person satisfies a first condition selected from the group consisting of:
the first offer is for the benefit of the first related person,
the first offer is for the account of the first related person,
the first related person made an investment decision to make the first offer,
the first related person has a financial interest in the first offer,
the first related person is financially responsible (as principal, guarantor or otherwise) for the first offer,
the first related person is financially responsible (as principal, guarantor or otherwise) for a trade arising out of the first offer,
the first related person is acting as an agent with respect to the first offer, and
the first related person is acting as a principal with respect to the first offer;
then, after the first participant possesses information which discloses that the first identifier is associated with the first offer, communicating the first identifier from the first participant to the first disclosee in a manner which discloses to the first disclosee that the first related person satisfies the first condition;
(g) attempting to avoid public disclosure of information that is reasonably likely to disclose that the first related person satisfies the first condition;
(h) the offer matching system's publishing a first data packet that comprises the first identifier and a first data item, wherein:
the first data item concerns the first offer, and
the first data packet is published in a manner that permits the first disclosee to receive it regardless of whether the first disclosee has a right to receive confidential information concerning the first offer;
(i) the offer matching system's publishing a first collection of information, wherein the first collection comprises information which discloses that a second data item concerns a third offer that satisfies a second condition, the second condition comprising a requirement selected from the group consisting of:
that the first offer executed at least in part against the third offer,
that both the first offer and the third offer are for a single traded item,
that both the first offer and the third offer are for a single traded item and a side,
that both the first offer and the third offer are for a single traded item, the first offer is for a first side and the third offer is not for the first side,
that at a time when the first offer was capable of execution, the third offer executed in whole or in part against a fourth offer, wherein the fourth offer is not the first offer, and
that at a first time when the first offer was capable of execution: the third offer executed in whole or in part against a fifth offer, wherein the fifth offer is not the first offer, and the first offer could have executed in whole or in part against the fifth offer in accordance with the set of rules if the offer matching system had not possessed information concerning any other offers for a same side as the first offer, wherein the first collection is published in a manner that permits the first disclosee to receive the first collection regardless of whether the first disclosee has a right to receive confidential information concerning the third offer;

(j) the first disclosee's receiving the first data packet;
(k) the first disclosee's receiving the first collection;
(l) the first disclosee's detecting that the second data item concerns an offer that satisfies the second condition.

38. The method of claim 37 wherein:
under the set of rules, the offer matching system is permitted to disclose publicly that the first data item concerns an offer associated with the first identifier,
under the set of rules, the offer matching system is not permitted to disclose publicly that the first related person satisfies the first condition, and
under the set of rules, the offer matching system is permitted to disclose publicly the first collection.

39. The method of claim 37 wherein step (f) comprises:
communicating the first identifier from the first participant to a second disclosee in a manner which discloses to the second disclosee that the first related person satisfies the first condition, and
communicating the first identifier from the second disclosee to the first disclosee in a manner which discloses to the first disclosee that the first related person satisfies the first condition.

40. The method of claim 37 wherein the first related person selected from the group consisting of:
the first participant, and
the first disclosee.

41. The method of claim 37 with the following additional step:
before step (a), communicating [1101,1102] from the first disclosee to the first participant a second description [1151] of the first offer.

42. The method of claim 37 wherein a predetermined relationship exists between the first data item and the third offer, wherein the predetermined relationship is selected from the group consisting of:
the first data item contains information that was communicated to the offer matching system when a description of the third offer was first communicated to the offer matching system,
the first data item concerns an offer against which the third offer was executed at least in part,
the first data item identifies an offer against which the third offer was executed at least in part, and
the first data item identifies a transaction report for a trade in which the third offer was executed at least in part.

43. The method of claim 37 wherein only round lot quantities are considered when determining whether the third offer satisfies the second condition.

44. The method of claim 37 wherein the second condition further comprises a requirement that the third offer has a higher execution priority than the first offer.

45. A method for interacting with an offer matching system comprising the following steps:
(a) communicating from a first participant to the offer matching system a first description of a first offer;

(b) associating the first offer with a first identifier, the first identifier not associated with any offer other than the first offer;
(c) if the first description does not disclose the first identifier, then communicating the first identifier from the offer matching system to the first participant in a manner that discloses to the first participant that the first identifier is associated with the first offer;
(d) communicating from a second participant to the offer matching system a description of a second offer;
(e) the offer matching system's executing the first offer at least in part against the second offer in accordance with a set of rules that govern the operation of the offer matching system;
(f) if a first disclosee does not already possess information which discloses that the first identifier is associated with the first offer and that a first related person satisfies a first condition selected from the group consisting of:
the first offer is for the benefit of the first related person,
the first offer is for the account of the first related person,
the first related person made an investment decision to make the first offer,
the first related person has a financial interest in the first offer,
the first related person is financially responsible (as principal, guarantor or otherwise) for the first offer,
the first related person is financially responsible (as principal, guarantor or otherwise) for a trade arising out of the first offer,
the first related person is acting as an agent with respect to the first offer, and
the first related person is acting as a principal with respect to the first offer,
then, after the first participant possesses information which discloses that the first identifier is associated with the first offer, communicating the first identifier from the first participant to the first disclosee in a manner which discloses to the first disclosee that the first related person satisfies the first condition;
(g) attempting to avoid public disclosure of information that is reasonably likely to disclose that the first related person satisfies the first condition;
(h) communicating from the offer matching system to a first information publisher a first data packet that comprises the first identifier and a first data item, the first data item concerning the first offer;
(i) the first information publisher's publishing a second data packet comprising the first identifier and a second data item, wherein:
the second data item concerns the first offer, and
the second data packet is published in a manner that permits the first disclosee to receive it regardless of whether the first disclosee has a right to receive confidential information concerning the first offer;
(j) communicating from the offer matching system to the first information publisher a first collection of information, wherein the first collection comprises information which discloses that a second data item concerns a third offer that satisfies a second condition, the second condition comprising a requirement selected from the group consisting of:
that the first offer executed at least in part against the third offer,
that both the first offer and the third offer are for a single traded item,
that both the first offer and the third offer are for a single traded item and a side, that both the first offer and the third offer are for a single traded item, the first offer is for a first side and the third offer is not for the first side, that at a time when the first offer was capable of execution, the third offer executed in whole or in part against a fourth offer, wherein the fourth offer is not the first offer, and that at a first time when the first offer was capable of execution: the third offer executed in whole or in part against a fifth offer, wherein the fifth offer is not the first offer, and the first offer could have executed in whole or in part against the fifth offer in accordance with the set of rules if the offer matching system had not possessed information concerning any other offers for a same side as the first offer;

(k) the first information publisher's publishing a second collection of information, wherein the second collection comprises information which discloses that a third data item concerns an offer that satisfies the second condition, wherein the third data item concerns the third offer, and the second collection is published in a manner that permits the first disclosee to receive it regardless of whether the first disclosee has a right to receive confidential information concerning the third offer;

(l) the first disclosee's receiving the second data packet;

(m) the first disclosee's receiving the second collection;

(n) the first disclosee's detecting that the third data item concerns an offer that satisfies the second condition.

46. The method of claim 45 wherein:

under the set of rules, the offer matching system is permitted to disclose publicly that the first data item concerns an offer associated with the first identifier, under the set of rules, the offer matching system is not permitted to disclose publicly that the first related person satisfies the first condition, and under the set of rules, the offer matching system is permitted to disclose publicly the first collection.

47. The method of claim 45 wherein step (f) comprises:

communicating the first identifier from the first participant to a second disclosee in a manner which discloses to the second disclosee that the first related person satisfies the first condition, and communicating the first identifier from the second disclosee to the first disclosee in a manner which discloses to the first disclosee that the first related person satisfies the first condition.

48. The method of claim 45 wherein the first related person is selected from the group consisting of:

the first participant, and the first disclosee.

49. The method of claim 45 with the following additional step:

before step (a), communicating [1101,1102] from the first disclosee to the first participant a second description [1151] of the first offer.

50. The method of claim 45 wherein a predetermined relationship exists between the first data item and the third offer, wherein the predetermined relationship is selected from the group consisting of:

the first data item contains information that was communicated to the offer matching system when a description of the third offer was first communicated to the offer matching system, the first data item concerns an offer against which the third offer was executed at least in part, the first data item identifies an offer against which the third offer was executed at least in part, and the first data item identifies a transaction report for a trade in which the third offer was executed at least in part.

51. The method of claim 45 wherein only round lot quantities are considered when determining whether the third offer satisfies the second condition.

52. The method of claim 45 wherein the second condition further comprises a requirement that the third offer has a higher execution priority than the first offer.

53. The method of claim 45 wherein the second data item satisfies a predetermined requirement, wherein the predetermined requirement is selected from the group consisting of:

the second data item identifies a transaction report for a trade in which the first offer was executed at least in part, the second data item concerns the second offer, the second data item identifies the second offer, the second data item contains information that was communicated to the offer matching system in step (a), the second data item is the same as the first data item, the second data item contains information that was calculated by the first information publisher, and the second data item contains information that was calculated by the first information publisher based at least in part upon information not received from the offer matching system.

54. A method for interacting with an offer matching system comprising the following steps:

(a) storing [1112] in the offer matching system a first association among a first target, a first monitor and a first condition, the first condition comprising a requirement selected from the group consisting of:

an offer is for the benefit of the first target, an offer is for the account of the first target, the first target made an investment decision to make an offer, the first target has a financial interest in an offer, the first target is financially responsible (as principal, guarantor or otherwise) for an offer, the first target is financially responsible (as principal, guarantor or otherwise) for a trade arising out of an offer, the first target is acting as an agent with respect to an offer, and the first target is acting as a principal with respect to an offer, (b) communicating [1103,1104] from a first participant to the offer matching system a description [1152] of a first offer;

(c) communicating [1201,1202] from a second participant to the offer matching system a description [1251] of a second offer;

(d) the offer matching system's executing [1203] the first offer at least in part against the second offer in accordance with a set of rules that govern the operation of the offer matching system;

(e) determining [1311] that the first offer satisfies the first condition;

(f) after step (e), communicating [1309,1310] from the offer matching system to the first monitor a first data item [1354] in a manner that discloses to the first monitor that the first data item concerns an offer that satisfies the first condition, wherein the first data item concerns the first offer, and the monitor does not already possess information which discloses that the first data item concerns an offer that satisfies the first condition, whereby the first monitor gains information which discloses that the first data item concerns an offer that satisfies the first condition; and (g) attempting to avoid publicly disclosing that the first data item concerns an offer that satisfies the first condition.

55. The method of claim 54 wherein:

under the set of rules, the offer matching system is permitted to disclose to the first monitor that the first data item concerns an offer that satisfies the first condition, and under the set of rules, the offer matching system is not permitted to disclose publicly that the first data item concerns an offer that satisfies the first condition.

56. The method of claim 54 wherein the set of rules would not permit the offer matching system to disclose to the monitor that the first data item concerns an offer that satisfies the first condition if the first association were not stored in the offer matching system.

57. The method of claim 54 wherein step (a) is performed in response to a request from the first participant.

58. The method of claim 54 wherein the first monitor is the first target.

59. The method of claim 54 wherein the first condition comprises an additional requirement that the first offer is not yet fully executed.

60. A method for an offer matching system to publish information about a first offer comprising the following steps:

(a) receiving from a first participant a first description of the first offer;

(b) associating the first offer with a first identifier, the first identifier not associated with any offer other than the first offer;

(c) if the first description did not disclose the first identifier, sending the first identifier to the first participant in a manner that discloses to the first participant that the first identifier is associated with the first offer;

(d) receiving from a second participant a description of a second offer;

(e) the offer matching system's executing the first offer at least in part against the second offer in accordance with a set of rules that govern the operation of the offer matching system;

(f) publishing a first data packet that comprises the first identifier and a first data item, the first data item concerning the first offer;

(g) a first information publishing system's receiving the first data packet; and (h) the first information publishing system's publishing a second data packet that comprises:

(1) the first identifier and (2) a second data item, wherein:

(A) the second data item:

(I) was not contained in the first data packet, (II) was calculated by the first information publishing system, and (III) concerns an item selected from the group comprised of the first offer and an execution of the first offer against the second offer; and (B) calculation of the second data item depends upon a third data item that is not obtained from the offer matching system.

61. A method for an offer matching system to publish information comprising the following steps:

(a) receiving from a first participant a first description of a first offer;

(b) receiving from a second participant a second description for a second offer;

(c) associating the first offer with a first identifier, the first identifier not associated with any offer other than the first offer;

(d) if the first description did not disclose the first identifier, sending the first identifier to the first participant in a manner that discloses to the first participant that the first identifier is associated with the first offer;

(e) the offer matching system's executing the first offer at least in part against the second offer in accordance with a set of rules that govern the operation of the offer matching system; and (f) publishing a first data packet that comprises the first identifier and a first data item, the first data item concerning an execution of the first offer against the second offer (g) a first information publishing system's receiving the first data packet; and (h) the first information publishing system's publishing a second data packet that comprises:

(1) the first identifier and (2) a second data item, wherein:

(A) the second data item:

(I) was not contained in the first data packet, (II) was calculated by the first information publishing system, and (III) concerns an item selected from the group comprised of the first offer, the second offer, and an execution of the first offer against the second offer; and (B) calculation of the second data item depends upon a third data item that is not obtained from the offer matching system.

62. A method for processing offers in an offer matching system comprising the steps of:

(a) receiving from a first person a first description of a first offer, the first description comprising a first data item that identifies a future time, wherein:

the first data item permits specifying the future time in increments at least as small as one minute;

the future time is at least two hours in the future, and the future time is not at or near a time when the offer matching system is scheduled to commence offer matching, the offer matching system is scheduled to suspend offer matching, the offer matching system is scheduled both to commence and to suspend offer matching, or the offer matching system is scheduled to conduct a single call auction;

a second data item that indicates a first side for the first offer and a third data item that identifies a first traded item;

(b) receiving from a second person a second description of a second offer wherein the second offer is for the first side and the first traded item;

(c) receiving from a third person a third description of a third offer wherein the third offer is for the first traded item but is not for the first side;

(d) until the offer matching system determines that the future time has occurred, refusing to execute the first offer against any other offer;
(e) after receiving the first description but before the offer matching system determines that the future time has occurred, executing the second offer at least in part against the third offer, wherein, if the offer matching system had already determined that the future time had occurred, the second offer would have had a lower execution priority than the first offer and the offer matching system would not have executed the second offer even in part against the third offer; and
(f) after the offer matching system determines that the future time has occurred, attempting at least one time to execute the first offer against at least one other offer in accordance with a set of rules that govern the operation of the offer matching system and, if it can be so executed, so executing it.

63. The method of claim 62 wherein the first data item permits specifying the future time in increments at least as small as one second.

64. The method of claim 62 or claim 63 wherein the future time is at least twelve hours in the future.

65. An offer matching system comprising:
(a) means for communicating from a first participant to the offer matching system a first description of a first offer;
(b) means for associating the first offer with a first identifier, the first identifier not associated with any offer other than the first offer;
(c) means responsive to the first description's not disclosing the first identifier, for then communicating the first identifier from the offer matching system to the first participant in a manner that discloses to the first participant that the first identifier is associated with the first offer;
(d) means for communicating from a second participant to the offer matching system a description of a second offer;
(e) means for executing the first offer at least in part against the second offer in accordance with a set of rules that govern the operation of the offer matching system;
(f) means responsive to a first disclosee's not already possessing information which discloses that the first identifier is associated with the first offer and a first related person satisfying a first condition selected from the group consisting of:
the first offer is for the benefit of the first related person,
the first offer is for the account of the first related person,
the first related person made an investment decision to make the first offer,
the first related person has a financial interest in the first offer,
the first related person is financially responsible (as principal, guarantor or otherwise) for the first offer,
the first related person is financially responsible (as principal, guarantor or otherwise) for a trade arising out of the first offer,
the first related person is acting as an agent with respect to the first offer, and
the first related person is acting as a principal with respect to the first offer, for communicating the first identifier from the first participant to the first disclosee, after the first participant possesses information which discloses that the first identifier is associated with the first offer, in a manner which discloses to the first disclosee that the first related person satisfies the first condition;
(g) means for attempting to avoid public disclosure of information that is reasonably likely to disclose that the first related person satisfies the first condition; and
(h) means for publishing a first data packet that comprises the first identifier and a first data item, wherein:
the first data item concerns the first offer, and
the first data packet is published in a manner that permits the first disclosee to receive it regardless of whether the first disclosee has a right to receive confidential information concerning the first offer;
(i) means for publishing a first collection of information, wherein the first collection comprises information which discloses that a second data item concerns a third offer that satisfies a second condition, the second condition comprising a requirement selected from the group consisting of:
that the first offer executed at least in part against the third offer,
that both the first offer and the third offer are for a single traded item,
that both the first offer and the third offer are for a single traded item and a side,
that both the first offer and the third offer are for a single traded item, the first offer is for a first side and the third offer is not for the first side,
that at a time when the first offer was capable of execution, the third offer executed in whole or in part against a fourth offer, wherein the fourth offer is not the first offer, and
that at a first time when the first offer was capable of execution: the third offer executed in whole or in part against a fifth offer, wherein the fifth offer is not the first offer, and the first offer could have executed in whole or in part against the fifth offer in accordance with the set of rules if the offer matching system had not possessed information concerning any other offers for a same side as the first offer,
wherein the first collection is published in a manner that permits the first disclosee to receive the first collection regardless of whether the first disclosee has a right to receive confidential information concerning the third offer;
(j) means for receiving the first data packet by the first disclosee;
(k) means for receiving the first collection by the first disclosee;
(l) means for detecting by the first disclosee that the second data item concerns an offer that satisfies the second condition.

66. A method for operating an offer matching or information publishing system, which system comprises a computer apparatus, for a traded item comprising the following steps:
(a) associating a first offer to buy or to sell the traded item with a first identifier;
(b) receiving a request for information, where:
(i) the request includes the first identifier and
(ii) the request is received in a manner that does not imply that the request is from a person entitled to receive nonpublic information concerning the first offer; and
(c) in response to the request, sending a reply comprising a data item that concerns the first offer.

67. The method of claim 66 wherein the data item is selected from the group consisting of:
(i) an identifier for a second offer replaced by the first offer,
(ii) an indication of whether the first offer may be executed in part without being executed in full, (iii) a time by which the first offer must be approved to avoid automatic cancellation,
(iv) information that identifies one or more circumstances in which the first offer will be automatically cancelled,
(v) information about how any trades arising out of the first offer are to be cleared and settled,
(vi) a time before which the first offer ought not be executed,
(vii) a time at which the first offer is scheduled to expire,
(viii) an indication of how often execution of the first offer may be attempted,
(ix) information that identifies a circumstance in which the quantity or price of the first offer may be automatically adjusted,
(x) a time when the first offer was initiated,
(xi) an indication of who initiated the first offer,
(xii) an indication of whether the first offer was submitted by or on behalf of a participant or member in an offer matching system,
(xiii) an indication of whether any odd lot portion of the first offer may be executed in part without being executed in whole,
(xiv) an indication of whether any round lot portion of the first offer may be broken into odd lots,
(xv) an indication of whether any odd lot portion of the first offer may be executed at a price that is not the same as a price at which a round lot has executed,
(xvi) an indication of whether the first offer was submitted by or on behalf of an issuer of the traded item,
(xvii) an indication of whether the first offer is a stabilizing offer,
(xviii) a time when the first offer was first received by a participant or member in an offer matching system,
(xix) a time when a description of the first offer was first received by an offer matching system,
(xx) an indication of how the first offer was generated,
(xxi) an indication of whether the first offer is for a long sale, short sale, or exempt short sale,
(xxii) an indication of whether the first offer was solicited by a participant or member in an offer matching system,
(xxiii) an identifier for, or information about, a second offer against which the first offer executed in whole or in part,
(xxiv) an identifier for a transaction report concerning, or information about, a trade in which the first offer executed in whole or in part,
(xxv) an identifier for, or information about, a second offer, where the second offer is for the same traded item as the first offer, for the same side as the first offer and has higher execution priority than the first offer,
(xxvi) an identifier for, or information about, a second offer, where the second offer is for the traded item, for the same side as the first offer and executed in whole or in part at a time, and for a price, which would not have violated any of the requirements of the first offer,
(xxvii) an identifier for a transaction report concerning, or information about, a trade for the traded item not involving the first offer, where the trade occurred at a time, and for a price, which would not have violated any of the requirements of the first offer,
(xxviii) if the system is an information publishing system, information calculated by the system based at least in part upon information that was not received by the system from an offer matching system that processed the first offer,
(xxix) the price of the first offer, either initial or current, and
(xxx) the quantity of the first offer, either initial or remaining.

68. The method of claim 66 wherein:
(i) the request comprises a requirement that a first event occur, the first event being selected from the group consisting of:
(A) that a second data item concerning the first offer changes,
(B) that the first offer is modified,
(C) that the first offer is cancelled,
(D) that the first offer expires,
(E) that the first offer becomes executable,
(F) that the status of the first offer changes, and
(G) that the first offer is executed at least in part; and
(ii) step (c) is not performed until after the first event occurs.

69. An offer matching or information publishing system for a traded item comprising:
(a) a means for associating a first offer to buy or to sell the traded item with a first identifier;
(b) a means for receiving a request for information, where:
(i) the request includes the first identifier and
(ii) the request is received in a manner that does not imply that the request is from a person entitled to receive nonpublic information concerning the first offer; and
(c) a means for sending a reply in response to the request, where the reply comprises a data item that concerns the first offer.

70. A method for interacting with an offer matching or information publishing system, which system comprises a computer apparatus, for a traded item comprising the following steps:
(a) a first disclosee's determining a first identifier associated with a first offer to buy or to sell the traded item;
(b) the first disclosee's sending to the system a request for information, where:
(i) the request includes the first identifier and
(ii) the request is made in a manner that does not imply that the request is from a person entitled to receive nonpublic information concerning the first offer; and
(c) the first disclosee's receiving from the system, in response to the request, a reply that comprises a data item that concerns the first offer, where the data item is not the first identifier.

71. The method of claim 70 wherein:
(i) the first disclosee possesses information which discloses that a first related person satisfies a first condition selected from the group consisting of:
(A) the first offer is for the, benefit of the first related person,
(B) the first offer is for the account of the first related person,
(C) the first related person made an investment decision to make the first offer,
(D) the first related person has a financial interest in the first offer,
(E) the first related person is financially responsible (as principal, guarantor or otherwise) for the first offer,
(F) the first related person is financially responsible (as principal, guarantor or otherwise) for a trade arising out of the first offer,
(G) the first related person is acting as an agent with respect to the first offer, and
(H) the first related person is acting as a principal with respect to the first offer; and (ii) neither the first disclosee nor the system publicly discloses that the first related person satisfies the first condition.

72. The method of claim 70 wherein until step (c) is performed, the first disclosee does not possess information which discloses that the first data item concerns the first offer.

73. The method of claim 70 with the following additional step:
(d) the first disclosee's comparing the first data item with a description of the first offer that was not received from the system.

74. A method for operating an offer matching or information publishing system, which system comprises a computer apparatus, for a traded item comprising the following steps:
(a) associating a first offer to buy or to sell the traded item with a first identifier;
(b) publishing, in a manner that permits receipt and use by members of the public with no right to receive nonpublic information about the first offer, a data packet that comprises the first identifier and a data item concerning 'the first offer, where the data item is not the first identifier.

75. The method of claim 74 wherein the data item is selected from the group consisting of:
(i) an identifier for a second offer replaced by the first offer,
(ii) an indication of whether the first offer may be executed in part without being executed in full,
(iii) a time by which the first offer must be approved to avoid automatic cancellation,
(iv) information that identifies one or more circumstances in which the first offer will be automatically cancelled,
(v) information about how any trades arising out of the first offer are to be cleared and settled,
(vi) a time before which the first offer ought not be executed,
(vii) a time at which the first offer is scheduled to expire,
(viii) an indication of how often execution of the first offer may be attempted,
(ix) information that identifies a circumstance in which the quantity or price of the first offer may be automatically adjusted,
(x) a time when the first offer was initiated,
(xi) an indication of who initiated the first offer,
(xii) an indication of whether the first offer was submitted by or on behalf of a participant or member in an offer matching system,
(xiii) an indication of whether any odd lot portion of the first offer may be executed in part without being executed in whole,
(xiv) an indication of whether any round lot portion of the first offer may be broken into odd lots,
(xv) an indication of whether any odd lot portion of the first offer may be executed at a price that is not the same as a price at which a round lot has executed,
(xvi) an indication of whether the first offer was submitted by or on behalf of an issuer of the traded item,
(xvii) an indication of whether the first offer is a stabilizing offer,
(xviii) a time when the first offer was first received by a participant or member in an offer matching system,
(xix) a time when a description of the first offer was first received by an offer matching system,
(xx) an indication of how the first offer was generated,
(xxi) an indication of whether the first offer is for a long sale, short sale, or exempt short sale
(xxii) an indication of whether the first offer was solicited by a participant or member in an offer matching system,
(xxiii) an identifier for, or information about, a second offer against which the first offer executed in whole or in part,
(xxiv) an identifier for a transaction report concerning, or information about, a trade in which the first offer executed in whole or in part,
(xxv) an identifier for, or information about, a second offer, where the second offer is for the same traded item as the first offer, for the same side as the first offer and has higher execution priority than the first offer,
(xxvi) an identifier for, or information about, a second offer, where the second offer is for the traded item, for the same side as the first offer and executed in whole or in part at a time, and for a price, which would not have violated any of the requirements of the first offer,
(xxvii) an identifier for a transaction report concerning, or information about, a trade for the traded item not involving the first offer, where the trade occurred at a time, and for a price, which would not have violated any of the requirements of the first offer,
(xxviii) if the system is an information publishing system, information calculated by the system based at least in part upon information that was not received by the system from an offer matching system that processed the first offer,
(xxix) the price of the first offer, either initial or current, and
(xxx) the quantity of the first offer, either initial or remaining.

76. An offer matching or information publishing system for a traded item comprising:
(a) a means for associating a first offer to buy or to sell the traded item with a first identifier;
(b) a means for publishing, in a manner that permits receipt and use by members of the public with no right to receive nonpublic information about the first offer, a data packet that comprises the first identifier and a data item concerning the first offer, where the data item is not the first identifier.

77. A method for interacting with an offer matching or information publishing system, which system comprises a computer apparatus, for a traded item comprising the following steps:
(a) a first disclosee's determining a first identifier associated with a first offer to buy or to sell the traded item;
(b) the first disclosee's receiving a data packet from the system, where:
(i) the first disclosee received the data packet in a manner that would permit members of the public with no right to receive nonpublic information about the first offer to receive and to use such data packet,
(ii) the data packet comprises the first identifier,
(iii) the data packet comprises a data item that concerns the first offer, where the data item is not the first identifier, and
(iv) until receiving the data packet, the first disclosee did not know that the data item concerns the first offer; and
(c) the first disclosee's detecting that the data packet includes the first identifier, whereby the first disclosee gains possession of information which discloses that the data item concerns the first offer.

78. The method of claim 77, wherein the first disclosee determines the first identifier by a method selected from the group consisting of:
selecting,
generating,
receiving and
calculating.

79. A method for operating an offer matching system, which system comprises a computer apparatus, comprising the following steps:
- (a) storing in the offer matching system an association among a first participant and a first monitor, where the first monitor is not the first participant;
- (b) receiving a first description for a first offer;
- (c) determining that the first description is from the first participant;
- (d) receiving a message from the first monitor that approves the first offer;
- (e) before step (d), refusing to execute the first offer against any other offer; and
- (f) after step (d), executing the first offer at least in part against a second offer.

80. A method for executing offers in an offer matching system, which system comprises a computer apparatus, comprising the following steps:
- (a) storing in the offer matching system a description of a sell offer for the traded item that includes a minimum price at which the sell offer may be executed;
- (b) storing in the offer matching system a description of a buy offer for a traded item that includes a maximum price at which the buy offer may be executed, where the maximum price is greater than the minimum price;
- (c) selecting a first price that is indicative of recent trading activity for the traded item, where the first price is greater than the minimum price and the first price is less than the maximum price; and
- (d) executing the sell offer, in whole or in part, against the buy offer at the first price.

81. The method of claim 80 wherein the first price is the closing price for the traded item as of the most recent closing of the offer matching system.

82. A method for interacting with an offer matching system, which system comprises a computer apparatus, comprising the following steps:
- (a) communicating from a first disclosee to a first participant a first description of a first offer, the first disclosee is not the same as the first participant;
- (b) communicating from the first participant to the offer matching system a second description of the first offer;
- (c) communicating from a second participant to the offer matching system a description of a second offer;
- (d) the offer matching system's executing the first offer at least in part against the second offer in accordance with a set of rules that govern the operation of the offer matching system;
- (e) communicating from the first disclosee to the first participant a first request for information concerning the first offer;
- (f) in response to the first request, communicating from the first participant to the offer matching system a second request for information concerning the first offer;
- (g) in response to the second request, communicating from the offer matching system to the first disclosee a first response comprising:
  - a first data item responsive to the first request and
  - a first digital signature from the offer matching system.

83. The method of claim 82 wherein step (g) is performed by communicating from the offer matching system to the first participant the first response and communicating from the first participant to the first disclosee a second response comprising the first data item and the first digital signature.

84. The method of claim 82 wherein:
the first request comprises a requirement that a first event occur, the first event being selected from the group consisting of:
- that a second data item associated with the first offer changes,
- that the first offer is modified,
- that the first offer is cancelled,
- that the first offer expires, and
- that the first offer is executed by the offer matching system at least in part, and step (g) is not performed until after the first event occurs.

85. The method of claim 82 wherein a predetermined relationship exists between the first data item and the second offer, wherein the predetermined relationship is selected from the group consisting of:
- the first data item concerns the second offer,
- the first data item identifies the second offer, and
- the first data item identifies a transaction report for a trade in which the first offer was executed against the second offer at least in part.

86. A method for an offer matching system, which system comprises a computer apparatus, to publish information about a first offer comprising the following steps:
- (a) receiving from a first participant a first description of the first offer;
- (b) associating the first offer with a first identifier, the first identifier not associated with any offer other than the first offer;
- (c) if the first description did not disclose the first identifier, sending the first identifier to the first participant in a manner that discloses to the first participant that the first identifier is associated with the first offer;
- (d) receiving from a second participant a description of a second offer;
- (e) the offer matching system's executing the first offer at least in part against the second offer in accordance with a set of rules that govern the operation of the offer matching system;
- (f) publishing a first data packet that comprises the first identifier and a first data item, the first data item concerning the first offer.

87. The method of claim 86 wherein, under the set of rules, the offer matching system is permitted to disclose publicly that the first data item concerns an offer associated with the first identifier.

88. The method of claim 86 wherein a predetermined relationship exists between the first data item and the second offer, wherein the predetermined relationship is selected from the group consisting of:
- the first data item concerns the second offer,
- the first data item identifies the second offer, and
- the first data item identifies a transaction report for a trade in which the first offer was executed against the second offer at least in part.

89. The method of claim 86 with the following additional steps:
- a first information publishing system's receiving the first data packet; and
- the first information publishing system's publishing a second data packet that comprises the first identifier.

90. The method of claim 89 wherein the second data packet further comprises a second data item, wherein the second data item:
- was not contained in the first data packet,
- was calculated by the first information publishing system, and concerns an item selected from the group comprised of:
the first offer and
an execution of the first offer against the second offer.

91. A method for an offer matching system, which system comprises a computer apparatus, to publish information comprising the following steps:
(a) receiving from a first participant a first description of a first offer;
(b) receiving from a second participant a second description for a second offer;
(c) associating the first offer with a first identifier, the first identifier not associated with any offer other than the first offer;
(d) if the first description did not disclose the first identifier, sending the first identifier to the first participant in a manner that discloses to the first participant that the first identifier is associated with the first offer;
(e) the offer matching system's executing the first offer at least in part against the second offer in accordance with a set of rules that govern the operation of the offer matching system; and
(f) publishing a first data packet that comprises the first identifier and a first data item, the first data item concerning an execution of the first offer against the second offer.

92. The method of claim 91 wherein, under the set of rules, the offer matching system is permitted to disclose publicly that the first data item concerns an execution of the first offer against a different offer.

93. The method of claim 91 wherein the first data packet further comprises a second identifier associated with the second offer, the second identifier not associated with any offer other than the second offer.

94. The method of claim 91 wherein a predetermined relationship exists between the first data item and the first offer, wherein the predetermined relationship is selected from the group consisting of:
the first data item identifies the second offer,
the first data item identifies a transaction report for a trade in which the first offer was executed against the second offer at least in part,
the first data item specifies a price at which the first offer was executed against the second offer at least in part, and
the first data item specifies a quantity for which the first offer was executed against the second offer at least in part.

95. The method of claim 91 with the following additional steps:
a first information publishing system's receiving the first data packet; and
the first information publishing system's publishing a second data packet that comprises the first identifier and a second data item.

96. The method of claim 95 wherein the second data item:
was not contained in the first data packet,
was calculated by the first information publishing system, and
concerns an item selected from the group comprised of:
the first offer,
the second offer, and
an execution of the first offer against the second offer.

97. A method for operating an offer matching system, which system comprises a computer apparatus, comprising the following steps:
(a) storing in the offer matching system a first association among a first participant and a first monitor;
(b) receiving a first description for a first offer, the first offer comprising a first data item that indicates whether the first offer is an offer to buy or an offer to sell;
(c) determining that the first description is from the first participant;
(d) receiving from a second participant a second description for a second offer, the second offer comprising a second data item, wherein either:
the first data item indicates that the first offer is an offer to buy and the second data item indicates that the second offer is an offer to sell or
the first data item indicates that the first offer is an offer to sell and the second data item indicates that the second offer is an offer to buy;
(e) receiving a message that approves the first offer;
(f) determining that the message is from the first monitor;
(g) before step (f), refusing to execute the first offer against any other offer;
(h) after step (f), executing the first offer at least in part against the second offer.

98. A method for executing offers in an offer matching system, which system comprises a computer apparatus, that includes the following steps:
(a) storing in the offer matching system a description of a buy offer for a traded item;
(b) storing in the offer matching system a description of a sell offer for the traded item;
(c) detecting that the buy offer may be executed in whole or in part against the sell offer;
(d) determining a minimum price that is the lowest price at which the sell offer may be executed against the buy offer;
(e) determining a maximum price that is the highest price at which the buy offer may be executed against the sell offer, wherein the maximum price is greater than the minimum price;
(f) selecting a first price that is indicative of recent trading activity for the traded item;
(g) executing the buy offer against the sell offer, in whole or in part, at a second price that is equal to:
the minimum price, if the first price is less than the minimum price,
the first price, if the minimum price is less than the first price and the first price is less than the maximum price, or
the maximum price, if the first price is greater than the maximum price.

99. The method of claim 98 wherein the first price is a price at which the offer matching system previously executed a trade for the traded item.

100. The method of claim 98 wherein the first price is a weighted average price for a plurality of trades previously executed by the offer matching system.

101. The method of claim 100 wherein the plurality of trades used to calculate the first price exclude trades at unusually low or unusually high prices.

102. The method of claim 98 wherein the first price is dependent upon at least one data item that reflects trading in the traded item that did not occur through the offer matching system.

103. The method of claim 1, 12, 18, 24, 30, 37, 45, 54, 60, 61, 62, 66, 70, 74, 77, 79, 80, 81, 82, 86, 91, 97 or 98 wherein the first offer is an offer to buy or to sell a quantity of a traded item selected from the group consisting of:
a financial product,
a swap,
a security,
a commodity,
a futures contract, and
a currency.

104. The method of claim 1, 12, 18, 24, 30, 37, 45, 54, 60, 61, 62, 66, 70, 74, 77, 79, 80, 81, 82, 86, 91, 97 or 98 wherein at least one step is performed using the Internet.

105. The method of claim 1, 12, 18, 24, 30, 37, 45, 54, 60, 61, 62, 66, 70, 74, 77, 79, 80, 81, 82, 86, 91, 97 or 98 wherein at least one step is completed in near real time.

106. The method of claim 1, 12, 18, 24, 30, 37, 45, 54, 60, 61, 62, 66, 70, 74, 77, 79, 80, 81, 82, 86, 91, 97 or 98 wherein at least one step is performed using a database replication feature of a database management system.

* * * * *